United States Patent
Buttolo et al.

(10) Patent No.: US 10,046,637 B2
(45) Date of Patent: Aug. 14, 2018

(54) IN-VEHICLE COMPONENT CONTROL USER INTERFACE

(71) Applicant: Ford Global Technologies, LLC, Dearborn, MI (US)

(72) Inventors: Pietro Buttolo, Dearborn Heights, MI (US); Stephen Ronald Tokish, Sylvania, OH (US); James Stewart Rankin, II, Novi, MI (US); Stuart C. Salter, White Lake, MI (US); Gary Steven Strumolo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 14/966,742

(22) Filed: Dec. 11, 2015

(65) Prior Publication Data
US 2017/0166056 A1     Jun. 15, 2017

(51) Int. Cl.
*B60K 35/00* (2006.01)
*G06F 3/0482* (2013.01)
(Continued)

(52) U.S. Cl.
CPC .............. *B60K 35/00* (2013.01); *B60K 37/06* (2013.01); *G06F 3/0482* (2013.01); *G06F 3/04845* (2013.01); *G06F 3/04883* (2013.01); *B60K 2350/1028* (2013.01); *B60K 2350/1052* (2013.01); *B60K 2350/1068* (2013.01);
(Continued)

(58) Field of Classification Search
CPC ................. B60K 35/00; B60K 37/06; B60K 2350/1028; B60K 2350/1052; B60K 2350/921; B60K 2350/1068; B60K 2350/352; G06F 3/0482; G06F 3/04845; G06F 3/04883; B60R 16/037
See application file for complete search history.

(56) References Cited

U.S. PATENT DOCUMENTS 4,721,954 A    1/1988  Mauch
4,792,783 A   12/1988  Burgess et al.
(Continued)

FOREIGN PATENT DOCUMENTS

CN    102445954 B    3/2014
CN    103942963 A    7/2014
(Continued)

OTHER PUBLICATIONS

General Motors Corporation; Pontiac GTO Owner's Manual; 2005; pp. 3-19 and 3-20; https://my.gm.com/content/dam/gmownercenter/gmna/dynamic/manuals/2006/pontiac/gto/2006_gto_owners.pdf.
(Continued)

*Primary Examiner* — Richard M Camby
(74) *Attorney, Agent, or Firm* — Jennifer M. Stec; Brooks Kushman P.C.

(57) ABSTRACT

A personal device may include a display and a processor. The processor of the personal device may be programmed to send, to the display, a vehicle interior map overlaid with indications of in-vehicle components, create a group of the in-vehicle components responsive to receipt of a swipe gesture to the display selecting a subset of the indications, receive input from the display of a location on the map, and aim outputs of the in-vehicle components of the group based on the location.

10 Claims, 14 Drawing Sheets

(51) Int. Cl.
   *G06F 3/0484*     (2013.01)
   *G06F 3/0488*     (2013.01)
   *B60K 37/06*      (2006.01)
   *B60R 16/037*     (2006.01)

(52) U.S. Cl.
   CPC .. *B60K 2350/352* (2013.01); *B60K 2350/921*
         (2013.01); *B60R 16/037* (2013.01)

(56) References Cited

U.S. PATENT DOCUMENTS

| | | | |
|---|---|---|---|
| 4,962,302 | A | 10/1990 | Katsumi |
| 5,132,880 | A | 7/1992 | Kawamura |
| 5,143,437 | A | 9/1992 | Matsuno et al. |
| 5,255,442 | A | 10/1993 | Schierbeek et al. |
| 5,543,591 | A | 8/1996 | Gillespie et al. |
| 5,648,656 | A | 7/1997 | Begemann et al. |
| 5,650,929 | A | 7/1997 | Potter et al. |
| 5,697,844 | A | 12/1997 | Von Kohorn |
| 5,757,268 | A | 5/1998 | Toffolo et al. |
| 5,796,179 | A | 8/1998 | Honaga |
| 5,848,634 | A | 12/1998 | Will et al. |
| 5,850,174 | A | 12/1998 | DiCroce et al. |
| 6,028,537 | A | 2/2000 | Suman et al. |
| 6,377,860 | B1 | 4/2002 | Gray et al. |
| 6,397,249 | B1 | 5/2002 | Cromer et al. |
| 6,449,541 | B1 | 9/2002 | Goldberg et al. |
| 6,473,038 | B2 | 10/2002 | Patwari et al. |
| 6,536,928 | B1 | 3/2003 | Hein et al. |
| 6,935,763 | B2 | 8/2005 | Mueller et al. |
| 7,009,504 | B1 | 3/2006 | Banter et al. |
| 7,015,791 | B2 | 3/2006 | Huntzicker |
| 7,015,896 | B2 | 3/2006 | Levy et al. |
| 7,034,655 | B2 | 4/2006 | Magner et al. |
| 7,342,325 | B2 | 3/2008 | Rhodes |
| 7,502,620 | B2 | 3/2009 | Morgan et al. |
| 7,595,718 | B2 | 9/2009 | Chen |
| 7,672,757 | B2 | 3/2010 | Hong et al. |
| 7,706,740 | B2 | 4/2010 | Collins et al. |
| 7,778,651 | B2 | 8/2010 | Billhartz |
| 7,800,483 | B2 | 9/2010 | Bucher |
| 7,810,969 | B2 | 10/2010 | Blackmore et al. |
| 7,973,773 | B2 | 7/2011 | Pryor |
| 8,065,169 | B1 | 11/2011 | Oldham et al. |
| 8,073,589 | B2 | 12/2011 | Rasin et al. |
| 8,324,910 | B2 | 12/2012 | Lamborghini et al. |
| 8,344,850 | B2 | 1/2013 | Girard, III et al. |
| 8,408,766 | B2 | 4/2013 | Wilson et al. |
| 8,417,258 | B2 | 4/2013 | Barnes, Jr. |
| 8,421,589 | B2 | 4/2013 | Sultan et al. |
| 8,447,598 | B2 | 5/2013 | Chutorash et al. |
| 8,476,832 | B2 | 7/2013 | Prodin et al. |
| 8,482,430 | B2 | 7/2013 | Szczerba |
| 8,768,565 | B2 | 7/2014 | Jefferies et al. |
| 8,797,295 | B2 | 8/2014 | Bernstein et al. |
| 8,823,517 | B2 | 9/2014 | Hadsall, Sr. |
| 8,831,514 | B2 | 9/2014 | Tysowski |
| 8,856,543 | B2 | 10/2014 | Geiger et al. |
| 8,866,604 | B2 | 10/2014 | Rankin et al. |
| 8,873,147 | B1 | 10/2014 | Rhodes et al. |
| 8,873,841 | B2 | 10/2014 | Yang et al. |
| 8,880,100 | B2 | 11/2014 | Dobyns |
| 8,930,045 | B2 | 1/2015 | Oman et al. |
| 8,947,202 | B2 | 2/2015 | Tucker et al. |
| 9,053,516 | B2 | 6/2015 | Stempora |
| 9,078,200 | B2 | 7/2015 | Wuergler et al. |
| 9,104,537 | B1* | 8/2015 | Penilla ................... G06F 17/00 |
| 9,164,588 | B1 | 10/2015 | Johnson et al. |
| 9,288,270 | B1* | 3/2016 | Penilla ................. H04W 4/003 |
| 9,350,809 | B2 | 5/2016 | Leppanen |
| 9,357,054 | B1 | 5/2016 | Froment et al. |
| 9,417,691 | B2 | 8/2016 | Belimpasakis et al. |
| 2002/0069002 | A1 | 6/2002 | Morehouse |
| 2002/0070923 | A1 | 6/2002 | Levy et al. |
| 2002/0087423 | A1 | 7/2002 | Carbrey Palango et al. |
| 2002/0092019 | A1 | 7/2002 | Marcus |
| 2002/0096572 | A1 | 7/2002 | Chene et al. |
| 2002/0178385 | A1 | 11/2002 | Dent et al. |
| 2002/0197976 | A1 | 12/2002 | Liu et al. |
| 2003/0078709 | A1 | 4/2003 | Yester et al. |
| 2003/0171863 | A1 | 9/2003 | Plumeier et al. |
| 2004/0034455 | A1 | 2/2004 | Simonds et al. |
| 2004/0076015 | A1 | 4/2004 | Aoki et al. |
| 2004/0141634 | A1 | 7/2004 | Yamamoto et al. |
| 2004/0215532 | A1 | 10/2004 | Boman et al. |
| 2005/0040933 | A1 | 2/2005 | Huntzicker |
| 2005/0044906 | A1 | 3/2005 | Spielman |
| 2005/0099320 | A1 | 5/2005 | Nath et al. |
| 2005/0136845 | A1 | 6/2005 | Masouka et al. |
| 2005/0185399 | A1 | 8/2005 | Beermann et al. |
| 2005/0261807 | A1 | 11/2005 | Sorensen et al. |
| 2005/0261815 | A1 | 11/2005 | Cowelchuk et al. |
| 2005/0288837 | A1 | 12/2005 | Wiegand et al. |
| 2006/0075934 | A1 | 4/2006 | Ram |
| 2006/0089755 | A1 | 4/2006 | Ampunan et al. |
| 2006/0155429 | A1 | 7/2006 | Boone et al. |
| 2006/0155547 | A1 | 7/2006 | Browne et al. |
| 2006/0205456 | A1 | 9/2006 | Bentz et al. |
| 2006/0250217 | A1 | 11/2006 | Hamling et al. |
| 2006/0258377 | A1 | 11/2006 | Economos et al. |
| 2006/0271261 | A1 | 11/2006 | Flores et al. |
| 2007/0021885 | A1 | 1/2007 | Soehren |
| 2007/0140187 | A1 | 6/2007 | Rokusek et al. |
| 2007/0180503 | A1 | 8/2007 | Li et al. |
| 2007/0198472 | A1 | 8/2007 | Simonds et al. |
| 2007/0201389 | A1 | 8/2007 | Murayama |
| 2007/0262140 | A1 | 11/2007 | Long, Sr. |
| 2008/0140868 | A1 | 6/2008 | Kalayjian et al. |
| 2008/0180231 | A1 | 7/2008 | Chen |
| 2008/0261643 | A1 | 10/2008 | Bauer et al. |
| 2008/0288406 | A1 | 11/2008 | Seguin et al. |
| 2009/0249081 | A1 | 10/2009 | Zayas |
| 2009/0253439 | A1 | 10/2009 | Gantner et al. |
| 2010/0091394 | A1 | 4/2010 | DeWind et al. |
| 2010/0171696 | A1 | 7/2010 | Wu |
| 2010/0176917 | A1 | 7/2010 | Bacarella |
| 2010/0197359 | A1 | 8/2010 | Harris |
| 2010/0216401 | A1 | 8/2010 | Kitahara |
| 2010/0222939 | A1 | 9/2010 | Namburu et al. |
| 2010/0225443 | A1 | 9/2010 | Bayram et al. |
| 2010/0231958 | A1 | 9/2010 | Okigami |
| 2010/0233957 | A1 | 9/2010 | Dobosz |
| 2010/0235045 | A1 | 9/2010 | Craig et al. |
| 2010/0280711 | A1 | 11/2010 | Chen et al. |
| 2010/0315373 | A1 | 12/2010 | Steinhauser et al. |
| 2011/0086668 | A1 | 4/2011 | Patel |
| 2011/0137520 | A1 | 6/2011 | Rector et al. |
| 2011/0187496 | A1 | 8/2011 | Denison et al. |
| 2011/0199298 | A1 | 8/2011 | Bassompiere et al. |
| 2011/0219080 | A1 | 9/2011 | McWithey et al. |
| 2011/0264491 | A1 | 10/2011 | Bimbaum et al. |
| 2012/0006611 | A1 | 1/2012 | Wallace et al. |
| 2012/0032899 | A1* | 2/2012 | Waeller ............. G01C 21/3664 345/173 |
| 2012/0065815 | A1 | 3/2012 | Hess |
| 2012/0096908 | A1 | 4/2012 | Fuse |
| 2012/0098768 | A1 | 4/2012 | Bendewald et al. |
| 2012/0109451 | A1 | 5/2012 | Tan |
| 2012/0136802 | A1 | 5/2012 | McQuade et al. |
| 2012/0154114 | A1 | 6/2012 | Kawamura |
| 2012/0214463 | A1 | 8/2012 | Smith et al. |
| 2012/0214471 | A1 | 8/2012 | Tadayon et al. |
| 2012/0229253 | A1 | 9/2012 | Kolar |
| 2012/0244883 | A1 | 9/2012 | Tibbitts et al. |
| 2012/0254809 | A1 | 10/2012 | Yang et al. |
| 2012/0268235 | A1 | 10/2012 | Farhan et al. |
| 2012/0268242 | A1 | 10/2012 | Tieman et al. |
| 2013/0015951 | A1 | 1/2013 | Kuramochi et al. |
| 2013/0037252 | A1 | 2/2013 | Major et al. |
| 2013/0079951 | A1 | 3/2013 | Brickman |
| 2013/0099892 | A1 | 4/2013 | Tucker et al. |
| 2013/0116012 | A1 | 5/2013 | Okayasu |
| 2013/0218371 | A1 | 8/2013 | Simard et al. |
| 2013/0227647 | A1 | 8/2013 | Thomas et al. |

(56) References Cited

U.S. PATENT DOCUMENTS

| | | |
|---|---|---|
| 2013/0259232 A1 | 10/2013 | Petel |
| 2013/0261871 A1 | 10/2013 | Hobbs et al. |
| 2013/0283202 A1 | 10/2013 | Zhou et al. |
| 2013/0295908 A1 | 11/2013 | Zeinstra et al. |
| 2013/0300608 A1 | 11/2013 | Margalef et al. |
| 2013/0329111 A1 | 12/2013 | Desai et al. |
| 2013/0335222 A1 | 12/2013 | Comerford et al. |
| 2013/0342379 A1 | 12/2013 | Bauman et al. |
| 2014/0043152 A1 | 2/2014 | Lippman et al. |
| 2014/0068713 A1 | 3/2014 | Nicholson et al. |
| 2014/0121883 A1* | 5/2014 | Shen .............. B62D 15/0285 701/28 |
| 2014/0139454 A1 | 5/2014 | Mistry et al. |
| 2014/0142783 A1 | 5/2014 | Grimm et al. |
| 2014/0163774 A1 | 6/2014 | Demeniuk |
| 2014/0164559 A1 | 6/2014 | Demeniuk |
| 2014/0188348 A1 | 7/2014 | Gautama et al. |
| 2014/0200736 A1 | 7/2014 | Silvester |
| 2014/0212002 A1 | 7/2014 | Curcio et al. |
| 2014/0213287 A1 | 7/2014 | MacDonald et al. |
| 2014/0215120 A1 | 7/2014 | Saylor et al. |
| 2014/0226303 A1 | 8/2014 | Pasdar |
| 2014/0258727 A1 | 9/2014 | Schmit et al. |
| 2014/0277935 A1 | 9/2014 | Daman et al. |
| 2014/0279744 A1 | 9/2014 | Evans |
| 2014/0309806 A1 | 10/2014 | Ricci |
| 2014/0321321 A1 | 10/2014 | Knaappila |
| 2014/0335902 A1 | 11/2014 | Guba et al. |
| 2014/0375477 A1 | 12/2014 | Jain et al. |
| 2014/0379175 A1 | 12/2014 | Mittermeier |
| 2014/0380442 A1 | 12/2014 | Addepalli et al. |
| 2015/0039877 A1 | 2/2015 | Hall et al. |
| 2015/0048927 A1 | 2/2015 | Simmons |
| 2015/0094088 A1 | 4/2015 | Chen |
| 2015/0116085 A1 | 4/2015 | Juzswik |
| 2015/0116100 A1 | 4/2015 | Yang et al. |
| 2015/0123762 A1 | 5/2015 | Park et al. |
| 2015/0126171 A1 | 5/2015 | Miller et al. |
| 2015/0147974 A1 | 5/2015 | Tucker et al. |
| 2015/0148990 A1 | 5/2015 | Patel |
| 2015/0149042 A1 | 5/2015 | Cooper et al. |
| 2015/0154531 A1 | 6/2015 | Skaaksrud |
| 2015/0172902 A1 | 6/2015 | Kasslin et al. |
| 2015/0178034 A1 | 6/2015 | Penilla et al. |
| 2015/0181014 A1 | 6/2015 | Gerhardt et al. |
| 2015/0204965 A1 | 7/2015 | Magarida et al. |
| 2015/0210287 A1 | 7/2015 | Penilla et al. |
| 2015/0223151 A1 | 8/2015 | Lei et al. |
| 2015/0256668 A1 | 9/2015 | Atkinson et al. |
| 2015/0261219 A1 | 9/2015 | Cuddihy et al. |
| 2015/0261573 A1 | 9/2015 | Rausch et al. |
| 2015/0269797 A1 | 9/2015 | Kauffmann et al. |
| 2015/0278164 A1 | 10/2015 | Kim et al. |
| 2015/0283914 A1 | 10/2015 | Malone |
| 2015/0294518 A1 | 10/2015 | Peplin et al. |
| 2015/0332530 A1 | 11/2015 | Kishita |
| 2015/0352953 A1 | 12/2015 | Koravadi |
| 2015/0356797 A1 | 12/2015 | McBride et al. |
| 2015/0382160 A1 | 12/2015 | Slay, Jr. et al. |
| 2016/0039430 A1 | 2/2016 | Ricci |
| 2016/0055699 A1 | 2/2016 | Vincenti |
| 2016/0119782 A1 | 4/2016 | Kim |
| 2016/0133072 A1 | 5/2016 | Santavicca |
| 2016/0203661 A1 | 7/2016 | Pudar et al. |
| 2016/0214572 A1 | 7/2016 | Snider |
| 2016/0248905 A1 | 8/2016 | Miller et al. |
| 2016/0332535 A1 | 11/2016 | Bradley et al. |
| 2016/0360382 A1* | 12/2016 | Gross .............. G06F 3/0488 |
| 2017/0313426 A1 | 11/2017 | Morin |

FOREIGN PATENT DOCUMENTS

| | | |
|---|---|---|
| JP | 2011131833 A | 7/2011 |
| WO | 2013052043 A1 | 4/2013 |

OTHER PUBLICATIONS

Basin, "An In/Vehicle Human/Machine Interface Module," XML Journal, Jan. 3, 2003, (9 pages), retrieved from http://xml.sys/con.com/node/40547 on Dec. 13, 2014.

Shahzada, "Touch Interaction for User Authentication," Thesis, Carleton University, Ottawa, Ontario, May 2014 (124 pages).

Napa Sae/Bae et al., "Biometric/Rich Gestures: A Novel Approach to Authentication on Multi/touch Devices," NYU/Poly, CHI 2012, May 5/10, 2012, Austin, TX (10 pages).

Services/Bluetooth Development Portal, last accessed May 30, 2015, https://developer.bluetooth.org/gatt/services/Pages/ServicesHome.aspx. (1 page).

Azad, "The Quick Guide to GUIDs," Better Explained / Math insights that click, last accessed May 24, 2015, http://betterexplained.com/articles (15 pages).

Goodwin, "Add/on module auto/unlocks your car when your phone is near," CNET, Car Tech, Nov. 19, 2013, http://www.cnet.com/news/add/on/module/auto/unlocks/your/car/when/your/phone/is/near (2 pages).

Hertz 24/7, "Book. Unlock. Go. You can reserve your vehicle anywhere, anytime / up to 10 days in advance," last accessed Jul. 28, 2015, https://www.hertz247.com/parkridge/en/us/About (3 pages).

Klosowski, "Unlock Your Car with a Bluetooth Powered Keyless Entry System," Lifehacker, Sep. 30, 2013, http://lifehacker.com/unlock/your/car/with/a/bluetooth/powered/keyless/entry/1427088798 (2 pages).

Toyota, Toyota Prius C Brochure, 2015, available at http://www.toyota.com/priusc/ebrochure.

Thomas, "2010 Toyota Prius Touch Tracer Display," Mar. 3, 2009, available at https://www.cars.com/articles/2009/03/2010/toyota/prius/touch/tracer/display/.

Gahran, "Vehicle owner's manuals // now on smartphones," CNN.com, Jan. 31, 2011, available at http://www.cnn.com/2011/TECH/mobile/01/31/car.manual.phone/.

Specification of the Bluetooth System, Version 4.2, "Master Table of Contents & Compliance Requirements," Dec. 2, 2014, https://www.bluetooth.or/en/us/specification/adopted/specifications. (2,772 pages).

Bargshady et al., Precise Tracking of Things via Hybrid 3-D Fingerprint Database and Kernel Method Particle Filter, 2016, IEEE, p. 8963-8971.

Murugappan et al., Wireless EEG Signals based Neuromarketing System using Fast Fourier Transform (FFT), 2014, IEEE, p. 25-30.

Katoh et al., A Method of Advertisement Selection in Multiple RFID-Tags Sensor Network for a Ubiquitous Wide-Area Advertising Service, 2008, IEEE, p. 519-524.

* cited by examiner

IN-VEHICLE COMPONENT CONTROL USER INTERFACE

TECHNICAL FIELD

Aspects of the disclosure generally relate to a user interface of a personal device for zone-based or collective control of in-vehicle components.

BACKGROUND

Sales of personal devices, such as smartphones and wearables, continue to increase. Thus, more personal devices are brought by users into the automotive context. Smartphones can already be used in some vehicle models to access a wide range of vehicle information, to start the vehicle, and to open windows and doors. Some wearables are capable of providing real-time navigation information to the driver. Device manufacturers are implementing frameworks to enable a more seamless integration of their brand of personal devices into the driving experience.

SUMMARY

In a first illustrative embodiment, a system includes a personal device including a display; a processor, programmed to send, to the display, a vehicle interior map overlaid with indications of in-vehicle components, create a group of the in-vehicle components responsive to receipt of a gesture to the display selecting a subset of the indications, receive input from the display of a location on the map, and aim outputs of the in-vehicle components of the group based on the location.

In a second illustrative embodiment, a method includes displaying, on a touch screen, a vehicle interior map overlaid with indications of in-vehicle components providing outputs within the vehicle interior; receiving touch input to the screen indicating a location on the interior map to aim the in-vehicle components; and adjusting one or more of spread, intensity and direction of outputs of the in-vehicle components toward the location of the vehicle interior.

In a third illustrative embodiment, a non-transitory computer-readable medium embodying instructions that, when executed by a processor of a personal device, cause the personal device to: display a vehicle interior map overlaid with indications of a group of in-vehicle components providing outputs within the vehicle interior; receive input indicating a location on the interior map to aim the in-vehicle components; generate a first setting adjustment to a first in-vehicle component of the group to aim the output of the first in-vehicle component toward the location; and generate a second setting adjustment to a second in-vehicle component of the group to aim the output of the second in-vehicle component toward the location, the second setting adjustment being different from the first setting adjustment.

DETAILED DESCRIPTION

Figure 1A:
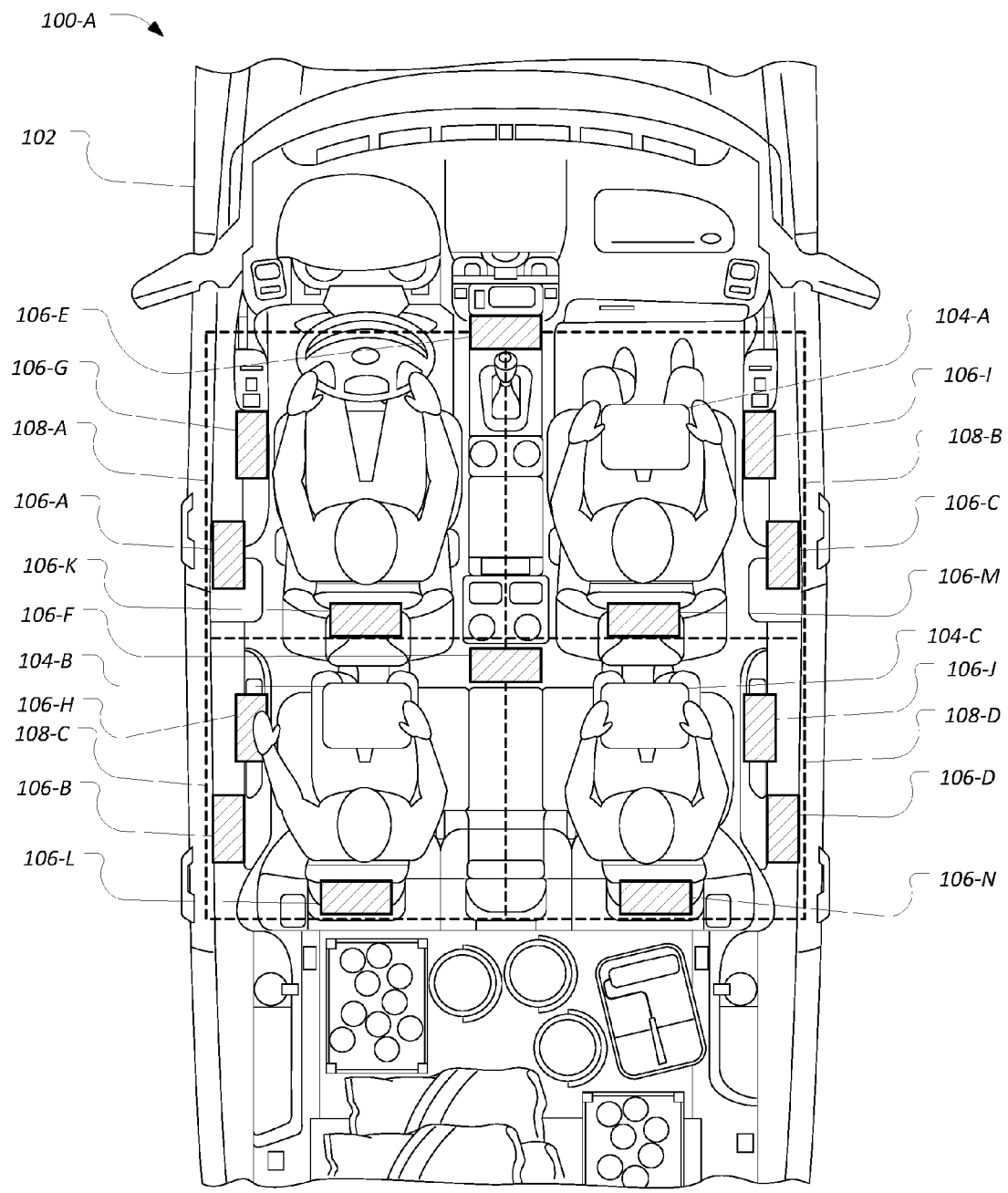
FIG. 1A illustrates an example system including a vehicle having a mesh of in-vehicle components configured to locate and interact with users and personal devices of the users.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle interior modules, such as reading lights or speakers, may be enhanced with a wireless communication interface such as Bluetooth Low Energy (BLE). These enhanced modules of the vehicle interior may be referred to as in-vehicle components. Vehicle occupants may utilize their personal devices to control features of the in-vehicle components over the communications interface. In an example, a vehicle occupant may utilize an application installed to the personal device to turn a reading light on or off or to adjust a volume of a speaker.

The location of the personal device within the vehicle cabin may be determined according to signal strength information between the in-vehicle components and the personal device. Based on the location, the personal device may identify what in-vehicle component features are available in the specific seating location of the user, as well as how to interact with the identified features. Accordingly, the personal device of the user may become an extension of the vehicle user interface.

A vehicle component interface application installed to the personal device may be used to provide the user interface on the personal device for the control of the in-vehicle components. When launched, the vehicle component interface application may detect, locate and display an illustration of the in-vehicle components on an intuitive map of the vehicle.

The vehicle component interface application may support a zone user interface mode and a functional entity user interface mode. In the zone mode, the user interface may allow the user to interact with the in-vehicle component features in the seating zone in which the user is located. The zone mode may be useful, in an example, for allowing the user to change lighting, climate, or other settings specific to the user's seating zone within the vehicle, without disturbing the settings of other users.

In the functional entity mode, the user interface may allow the user to interact with multiple in-vehicle components of a common type of function across multiple seating zones. The functional entity mode may be useful, in an example, for combining the functioning of multiple in-vehicle components into a single unit, e.g., to aim several lights or climate control vents within the vehicle cabin to a specified location. The functional entity mode may further allow for the complex selection of the in-vehicle components through swipe or other gestures to allow the user to craft a specific subset of in-vehicle components to be collectively controlled.

FIG. 1A illustrates an example system 100 including a vehicle 102 having a mesh of in-vehicle components 106 configured to locate and interact with users and personal devices 104 of the users. The system 100 may be configured to allow the users, such as vehicle occupants, to seamlessly interact with the in-vehicle components 106 in the vehicle 102 or with any other framework-enabled vehicle 102. Moreover, the interaction may be performed without requiring the personal devices 104 to have been paired with or be in communication with a head unit or other centralized computing platform of the vehicle 102.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The personal devices 104-A, 104-B and 104-C (collectively 104) may include mobile devices of the users, and/or wearable devices of the users. The mobile devices may be any of various types of portable computing device, such as cellular phones, tablet computers, smart watches, laptop computers, portable music players, or other devices capable of networked communication with other mobile devices. The wearable devices may include, as some non-limiting examples, smartwatches, smart glasses, fitness bands, control rings, or other personal mobility or accessory device designed to be worn and to communicate with the user's mobile device.

The in-vehicle components 106-A through 106-N (collectively 106) may include various elements of the vehicle 102 having user-configurable settings. These in-vehicle components 106 may include, as some examples, overhead light in-vehicle components 106-A through 106-D, climate control in-vehicle components 106-E and 106-F, seat control in-vehicle components 106-G through 106-J, and speaker in-vehicle components 106-K through 106-N. Other examples of in-vehicle components 106 are possible as well, such as rear seat entertainment screens or automated window shades. In many cases, the in-vehicle component 106 may expose controls such as buttons, sliders, and touchscreens that may be used by the user to configure the particular settings of the in-vehicle component 106. As some possibilities, the controls of the in-vehicle component 106 may allow the user to set a lighting level of a light control, set a temperature of a climate control, set a volume and source of audio for a speaker, and set a position of a seat.

The vehicle 102 interior may be divided into multiple zones 108, where each zone 108 may be associated with a seating position within the vehicle 102 interior. For instance, the front row of the illustrated vehicle 102 may include a first zone 108-A associated with the driver seating position, and a second zone 108-B associated with a front passenger seating position. The second row of the illustrated vehicle 102 may include a third zone 108-C associated with a driver-side rear seating position and a fourth zone 108-D associated with a passenger-side rear seating position. Variations on the number and arrangement of zones 108 are possible. For instance, an alternate second row may include an additional fifth zone 108 of a second-row middle seating position (not shown). Four occupants are illustrated as being inside the example vehicle 102, three of whom are using personal devices 104. A driver occupant in the zone 108-A is not using a personal device 104. A front passenger occupant in the zone 108-B is using the personal device 104-A. A rear driver-side passenger occupant in the zone 108-C is using the personal device 104-B. A rear passenger-side passenger occupant in the zone 108-D is using the personal device 104-C.

Each of the various in-vehicle components 106 present in the vehicle 102 interior may be associated with the one or more of the zones 108. As some examples, the in-vehicle components 106 may be associated with the zone 108 in which the respective in-vehicle component 106 is located and/or the one (or more) of the zones 108 that is controlled by the respective in-vehicle component 106. For instance, the light in-vehicle component 106-C accessible by the front passenger may be associated with the second zone 108-B, while the light in-vehicle component 106-D accessible by passenger-side rear may be associated with the fourth zone 108-D. It should be noted that the illustrated portion of the vehicle 102 in FIG. 1A is merely an example, and more, fewer, and/or differently located in-vehicle components 106 and zones 108 may be used.

Figure 1B:
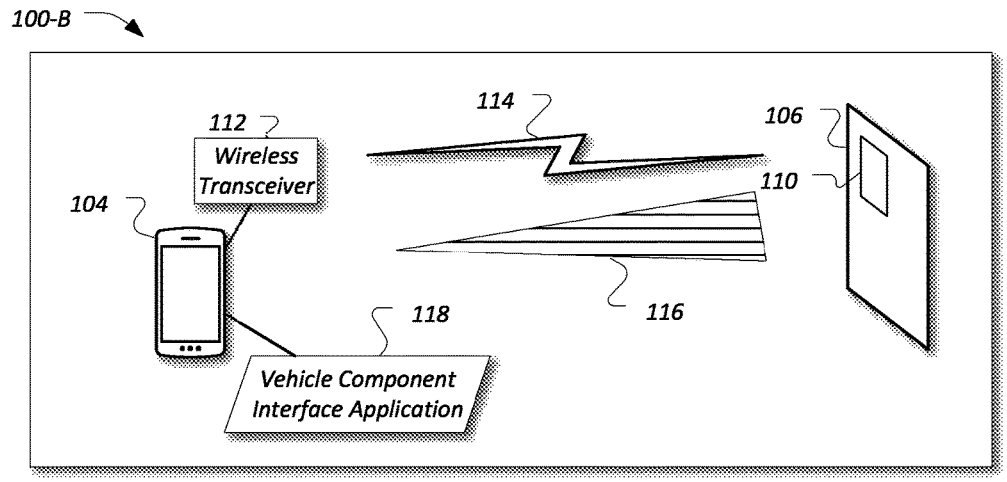
FIG. 1B illustrates an example in-vehicle component equipped with a wireless transceiver configured to facilitate detection of and identify proximity of the personal devices.

Referring to FIG. 1B, each in-vehicle component 106 may be equipped with a wireless transceiver 110 configured to facilitate detection of and identify proximity of the personal devices 104. In an example, the wireless transceiver 110 may include a wireless device, such as a Bluetooth Low Energy transceiver configured to enable low energy Bluetooth signal intensity as a locator, to determine the proximity of the personal devices 104. Detection of proximity of the personal device 104 by the wireless transceiver 110 may, in an example, cause a vehicle component interface application 118 of the detected personal device 104 to be activated.

In many examples the personal devices 104 may include a wireless transceiver 112 (e.g., a BLUETOOTH module, a ZIGBEE transceiver, a Wi-Fi transceiver, an IrDA transceiver, an RFID transceiver, etc.) configured to communicate with other compatible devices. In an example, the wireless transceiver 112 of the personal device 104 may communicate data with the wireless transceiver 110 of the in-vehicle component 106 over a wireless connection 114. In another example, a wireless transceiver 112 of a wearable personal device 104 may communicate data with a wireless transceiver 112 of a mobile personal device 104 over a wireless connection 114. The wireless connections 114 may be a Bluetooth Low Energy (BLE) connection, but other types of local wireless connection 114, such as Wi-Fi or Zigbee may be utilized as well.

The personal devices 104 may also include a device modem configured to facilitate communication of the personal devices 104 with other devices over a communications network. The communications network may provide communications services, such as packet-switched network services (e.g., Internet access, voice over internet protocol (VoIP) communication services), to devices connected to the communications network. An example of a communications network may include a cellular telephone network. To facilitate the communications over the communications network, personal devices 104 may be associated with unique device identifiers (e.g., mobile device numbers (MDNs), Internet protocol (IP) addresses, identifiers of the device modems, etc.) to identify the communications of the personal devices 104 over the communications network. These personal device 104 identifiers may also be utilized by the in-vehicle component 106 to identify the personal devices 104.

The vehicle component interface application 118 may be an application installed to the personal device 104. The vehicle component interface application 118 may be configured to facilitate vehicle occupant access to features of the in-vehicle components 106 exposed for networked configuration via the wireless transceiver 110. In some cases, the vehicle component interface application 118 may be configured to identify the available in-vehicle components 106, identify the available features and current settings of the identified in-vehicle components 106, and determine which of the available in-vehicle components 106 are within proximity to the vehicle occupant (e.g., in the same zone 108 as the location of the personal device 104). The vehicle component interface application 118 may be further configured to display a user interface descriptive of the available features, receive user input, and provide commands based on the user input to allow the user to control the features of the in-vehicle components 106. Thus, the system 100 may be configured to allow vehicle occupants to seamlessly interact with the in-vehicle components 106 in the vehicle 102, without requiring the personal devices 104 to have been paired with or be in communication with a head unit of the vehicle 102.

The system 100 may use one or more device location-tracking techniques to identify the zone 108 in which the personal device 104 is located. Location-tracking techniques may be classified depending on whether the estimate is based on proximity, angulation or lateration. Proximity methods are "coarse-grained," and may provide information regarding whether a target is within a predefined range but they do not provide an exact location of the target. Angulation methods estimate a position of the target according to angles between the target and reference locations. Lateration provide an estimate of the target location, starting from available distances between target and references. The distance of the target from a reference can be obtained from a measurement of signal strength 116 over the wireless connection 114 between the wireless transceiver 110 of the in-vehicle component 106 and the wireless transceiver 112 of the personal device 104, or from a time measurement of either arrival (TOA) or difference of arrival (TDOA).

One of the advantages of lateration using signal strength 116 is that it can leverage the already-existing received signal strength indication (RSSI) signal strength 116 information available in many communication protocols. For example, iBeacon uses the RSSI signal strength 116 information available in the Bluetooth Low-Energy (BLE) protocol to infer the distance of a beacon from a personal device 104 (i.e. a target), so that specific events can be triggered as the personal device 104 approaches the beacon. Other implementations expand on the concept, leveraging multiple references to estimate the location of the target. When the distance from three reference beacons are known, the location can be estimated in full (trilateration) from the following equations:

$$d_1^2 = (x-x_1)^2 + (y-y_1)^2 + (z-z_1)^2$$

$$d_2^2 = (x-x_2)^2 + (y-y_2)^2 + (z-z_2)^2$$

$$d_3^2 = (x-x_3)^2 + (y-y_3)^2 + (z-z_3)^2 \quad (1)$$

Figure 1C:
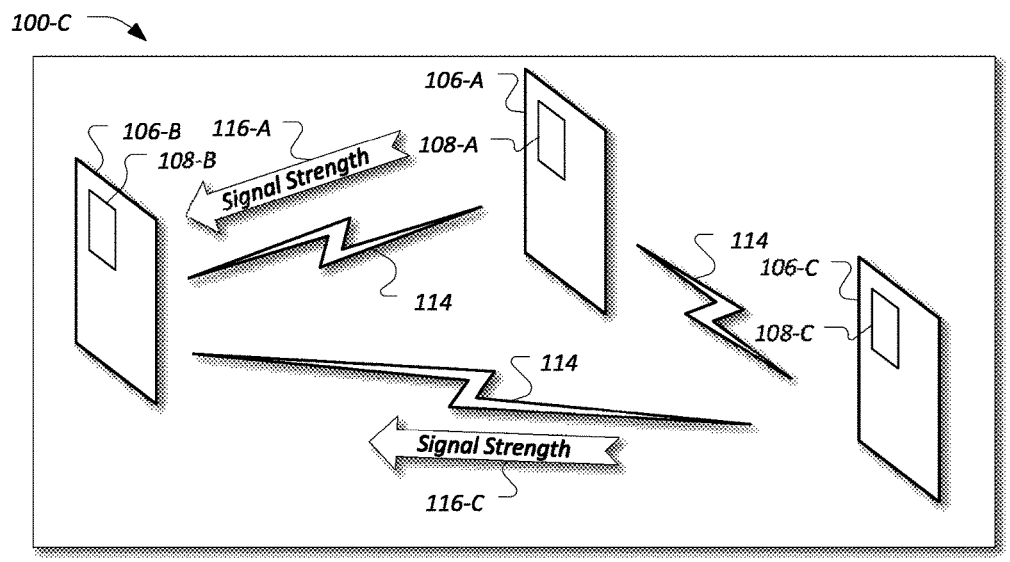
FIG. 1C illustrates an example in-vehicle component requesting signal strength from other in-vehicle components of the vehicle.

In an example, as shown in FIG. 1C, an in-vehicle component 106-B may broadcast or otherwise send a request for signal strength 116 to other in-vehicle components 106-A and 106-C of the vehicle 102. This request may cause the other in-vehicle components 106-A and 106-C to return wireless signal strength 116 data identified by their respective wireless transceiver 110 for whatever devices they detect (e.g., signal strength 116-A for the personal device 104 identified by the wireless transceiver 110-A, signal strength 116-C for the personal device 104 identified by the wireless transceiver 110-C). Using these signal strengths 116-A and 116-C, as well as signal strength 116-B determined by the in-vehicle component 106-B using its wireless transceiver 110-B, the in-vehicle component 106-B may use the equations (1) to perform trilateration and locate the personal device 104. As another possibility, the in-vehicle component 106 may identify the personal device 104 with the highest signal strength 116 at the in-vehicle component 106 as being the personal device 104 within the zone 108 as follows:

$$\text{Personal Device} = i \Rightarrow \max_{i=1,n} RSSI_i \quad (2)$$

Thus, the mesh of in-vehicle components 106 and the personal devices 104 may accordingly be utilized to allow the in-vehicle components 106 to identify in which zone 108 each personal device 104 is located.

To enable tracking of personal devices 104 within the vehicle 102, information descriptive of the location (e.g., zone 108) of each in-vehicle component 106 relative to the vehicle 102 interior may be to be broadcast by the in-vehicle components 106 to the other in-vehicle components 106 and personal devices 104. Moreover, to provide status information indicative of the current settings of the in-vehicle components 106, the in-vehicle components 106 may also broadcast status information and/or information indicative of when changes to the settings of the in-vehicle components 106 are made.

The vehicle component interface application 118 executed by the personal device 104 may be configured to scan for and update a data store of available in-vehicle components 106. As some examples, the scanning may be performed periodically, responsive to a user request to refresh, or upon activation of the vehicle component interface application 118. In examples where the scanning is performed automatically, the transition from vehicle 102 to vehicle 102 may be seamless, as the correct set of functionality is continuously refreshed and the user interface of the vehicle component interface application 118 is updated to reflect the changes.

In an example, advertising packets in broadcasting mode may be used to communicate location, event, or other information from the in-vehicle components 106 to the personal devices 104. This may be advantageous, as the personal devices 104 may be unable to preemptively connect to each of the in-vehicle components 106 to receive component information and status updates. In an example, the advertisements may be BLE advertisements, and location, component type, and event information may be embedded into the primary service universally unique identifier (UUID) that is included in the advertisement packet made by the in-vehicle component 106. By parsing the service UUIDs of the advertisement data of the in-vehicle component 106, personal devices 104 and other in-vehicle components 106 scanning for advertisements may be able to: (i) identify the existence in the vehicle 102 of the in-vehicle component 106, (ii) determine its location and zone 108 within the vehicle 102, and (iii) detect whether a physical interaction has taken place between a user and the in-vehicle component 106 (e.g., when changes are identified to the advertised data).

Figure 2:
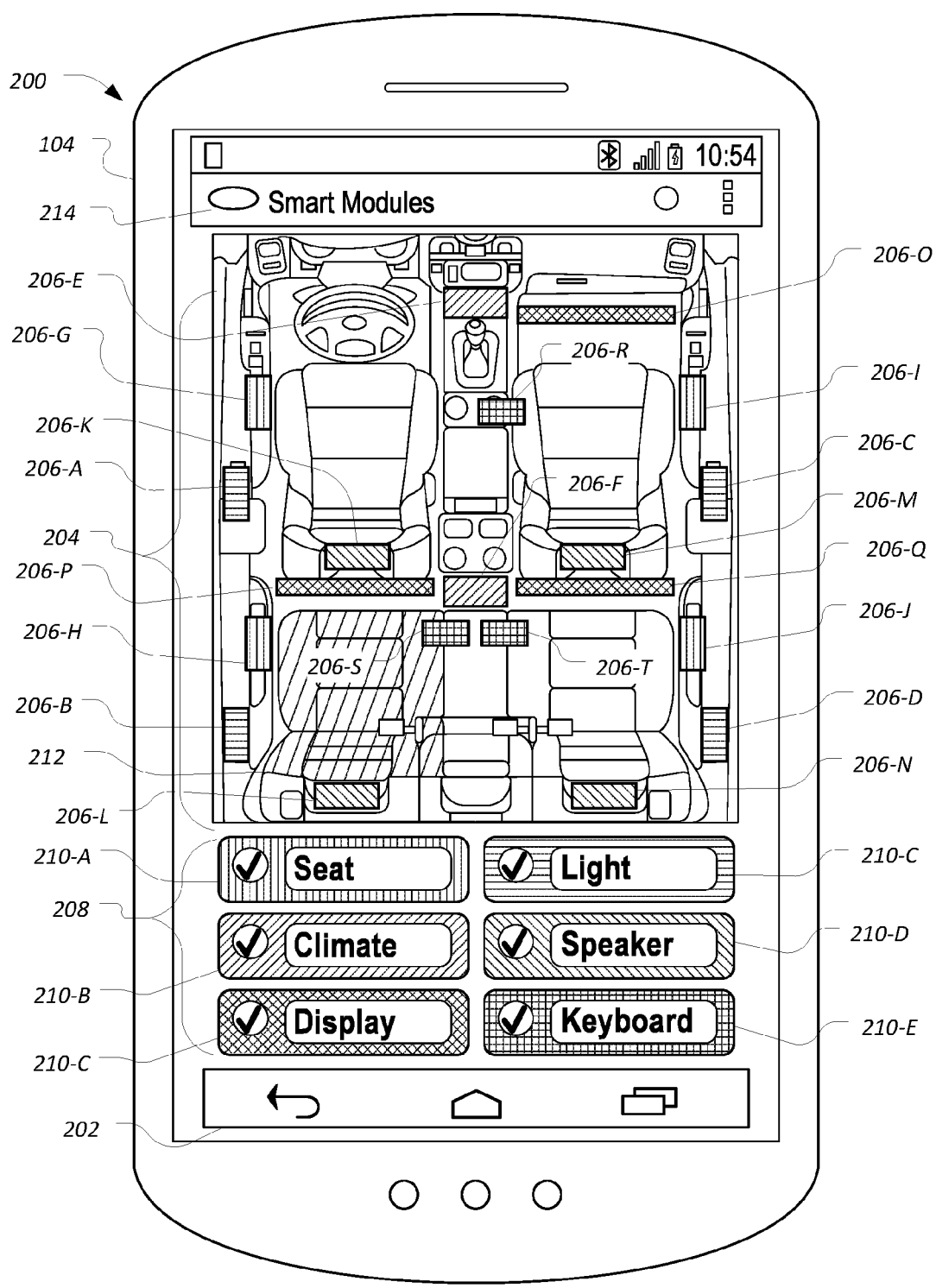
FIG. 2 illustrates an example user interface of the vehicle component interface application illustrating in-vehicle components detected by the personal device.

FIG. 2 illustrates an example user interface 200 of the vehicle component interface application 118 illustrating in-vehicle components 106 detected by the personal device 104. As shown, the user interface 200 is presented by the vehicle component interface application 118 on a display 202 of the personal device 104. The presented user interface 200 includes an interior map 204 of the vehicle 102 over which component indications 206 of the in-vehicle components 106 are displayed. Each of the component indications 206 may accordingly indicate a detected in-vehicle component 106 available for configuration by the user. The user interface 200 may further include a legend control 208 including type indications 210 for selecting the types of in-vehicle components 106 to be displayed over the interior map 204. The user interface 200 may also include a zone indication 212 to illustrate in which seating zone 108 the personal device 104 and user is located, and a title label 214 to indicate to the user that the user interface 200 is displaying an interface of in-vehicle components 106 as detected by the vehicle component interface application 118.

The interior map 204 of the vehicle 102 may illustrate an overhead view of the interior of the vehicle 102 over which the component indications 206 of the in-vehicle components 106 may be drawn in overlay. In an example, the interior map 204 may be a generic vehicle 102 interior image stored to the personal device 104. In another example, the interior map 104 may be downloaded from a server included within the vehicle 102, or from one of the in-vehicle components 106 configured to serve component information to the personal device 104. In yet another example, the one of the in-vehicle components 106 configured to serve component information to the personal device 104 may provide the personal device 104 with an identifier of the vehicle 102 (e.g., VIN), or an identifier of the interior map 204 image corresponding to the vehicle 102. This identifier may then be used in a query to a server external to the vehicle 102, which may return the interior map 204 to the personal device 104.

The component indications 206 may include graphics overlaid on the interior map 204 at relative locations of the in-vehicle components 106 within the vehicle 102. In an example, the location information may be encoded in the service UUIDs of the advertisement data of the in-vehicle component 106. As one possible encoding scheme, two-dimensional coordinates of the location of the in-vehicle component 106 may be encoded within the UUID (e.g., as a location in X from 0 being one size of the vehicle 102 to 64 being the other side and a location in Y from 0 being the front of the vehicle 102 to 64 being the back of the vehicle 102). Size and orientation information may also be similarly included in the UUID. In another example, the one of the in-vehicle components 106 configured to serve vehicle 102 information to the personal device 104 may provide the personal device 104 with an identifier of the vehicle 102 (e.g., VIN) which may be used to query a server external to the vehicle 102 to retrieve the interior locations and dimensions of the in-vehicle components 106.

As shown in the user interface 200, the component indications 206 may include, as some non-limiting examples, light component indications 206-A through 206-D, climate control component indications 206-E and 206-F, seat control component indications 206-G through 206-J, speaker component indications 206-K through 206-N, display component indications 206-O through 206-Q, and keyboard component indications 206-R through 206-T.

The legend control 208 may include one or more type indications 210, where each type indication 210 corresponds to one of the types of in-vehicle components 106 that is included within the vehicle 102. In an example, the type information may be encoded in the service UUIDs of the advertisement data of the in-vehicle component 106 as mentioned above. For instance, the UUID may include a first predefined type code for a seat control in-vehicle component 106, a second predefined type code for a climate control in-vehicle component 106, a third predefined type code for a display in-vehicle component 106, a fourth predefined type code for a light in-vehicle component 106, a fifth predefined type code for a speaker in-vehicle component 106, and a sixth predefined type code for a keyboard in-vehicle component 106.

The type indications 210 may be labeled according to the type of in-vehicle components 106 that they represent, and may be user selectable to allow the user to filter which of the in-vehicle component 106 are to be overlaid on the interior map 204. In an example, each of the type indications 210 may operate at a checkbox control, such that display or visibility of the component indications 206 of the in-vehicle components 106 of the corresponding type may be toggled responsive to user selection of the type indications 210.

As one non-limiting example, the type indications 210 may include a seat type indication 210-A presented in orange, a climate type indication 212-B presented in green, a display type indication 212-C presented in blue, a light type indication 210-C presented in yellow, a speaker type indication 210-D presented in purple, and a keyboard type indication 210-E presented in brown.

To strengthen the interface connection between the type indications 210 and the component indications 206, the component indications 206 for in-vehicle components 106 for a given type may be displayed in the same color or pattern as the corresponding type indication 210. To continue with the illustrated example, the light component indications 206-A through 206-D may be presented in yellow, the climate control component indications 206-E and 206-F may be presented in green, the seat control component indications 206-G through 206-J may be presented in orange, the speaker component indications 206-K through 206-N may be presented in purple, the display component indications 206-O through 206-Q may be presented in blue, and the keyboard component indications 206-R through 206-T may be presented in brown.

The zone indication 212 may indicate the seating zone 108 in which the personal device 104 of the occupant is located. As one example, the seating zone 108 in which the user is located may be displayed as a zone highlight 212 of that zone 108 on the interior map 204. As shown, the zone indication 212 indicates that the user is located within the rear driver side zone 108-C.

A user of the vehicle component interface application 118 may interact with the user interface 200 in a zone user interface mode or a functional entity user interface mode. In the zone mode, the user interface 200 may allow the user to interact with the in-vehicle component 106 features in the seating zone 108 in which the user is located. The zone mode may be useful, in an example, for allowing the user to change lighting, climate, or other settings specific to the user's seating zone 108 within the vehicle 102, without disturbing the settings of other users.

Figure 3:
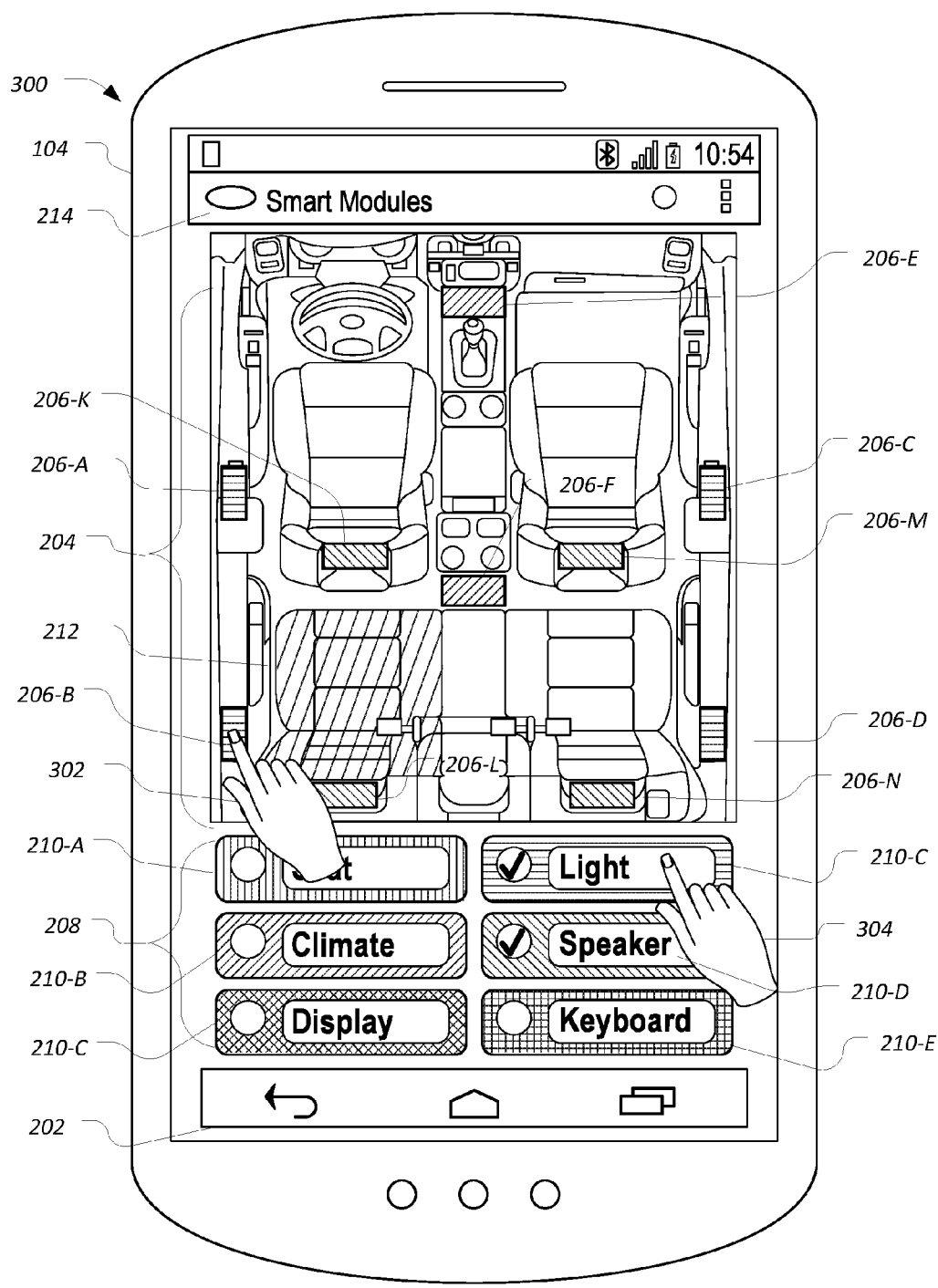
FIG. 3 illustrates an example user interface of the vehicle component interface application illustrating the selection of in-vehicle components.

FIG. 3 illustrates an example user interface 300 of the vehicle component interface application 118 illustrating the selection of in-vehicle components 106. In an example, the user may select an in-vehicle component 106, for example a light, by clicking on its component indication 206 in the user interface 300 (illustrated as selection 302) or by clicking on the type indication 210 corresponding to the type of in-vehicle component 106 (illustrated as selection 304). For instance, and depending on preferences, the in-vehicle component 106 may be selected by either tapping the component indication 206 or the type indication 210. Alternatively, a tap or long click could be used to indicate whether the user wants to just access the in-vehicle component 106, or also activate/deactivate the in-vehicle component 106 in a single gesture.

Moreover, it should further be noted that in the example user interface 300, certain types of in-vehicle components 106 have been deselected from being displayed in overlay. This deselection may be performed, in an example, by a user touching the type indications 210 to toggle off display or visibility of the associated component indications 206. As shown, the seat type indication 210-A, the climate type indication 212-B, the display type indication 212-C, and the a keyboard type indication 210-E are deselected, thereby hiding the corresponding seat, climate, display, and keyboard component indications 206 from being displayed.

In the functional entity mode, the user interface 200 may allow the user to interact with multiple in-vehicle components 106 of a common type of function across multiple seating zones 108. The functional entity mode may be useful, in an example, for combining the functioning of multiple in-vehicle components 106 into a single unit, e.g., to aim several lights or climate control vents within the vehicle cabin to a specified location. The functional entity mode may further allow for the complex selection of the in-vehicle components 106 through swipe or other gestures to allow the user to craft the specific subset of in-vehicle components 106 to be collectively controlled.

Figure 4:
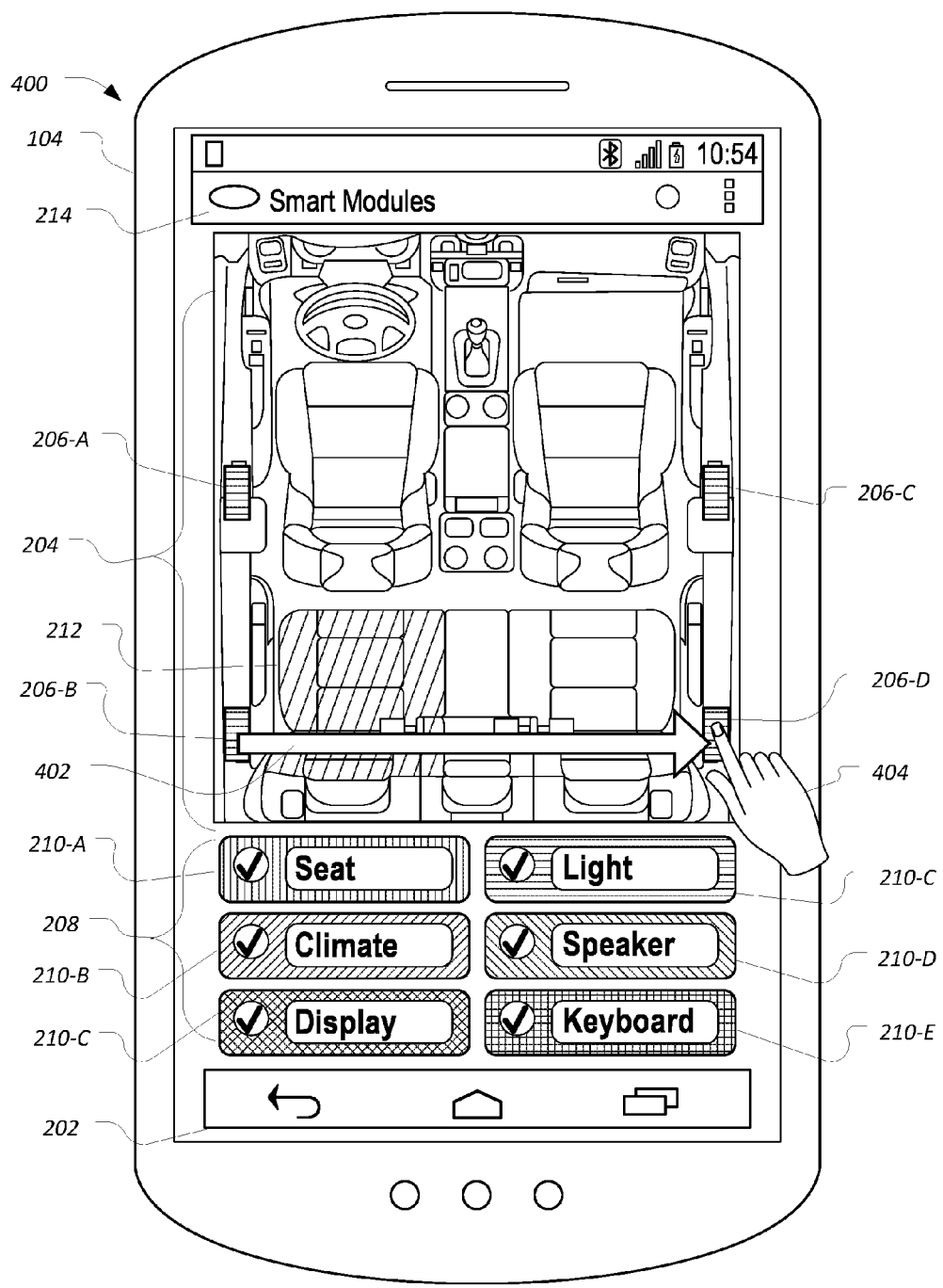
FIG. 4 illustrates an example user interface of the vehicle component interface application illustrating selection of in-vehicle components to be controlled in the functional entity mode.

FIG. 4 illustrates an example user interface 400 of the vehicle component interface application 118 illustrating selection of in-vehicle components 106 to be controlled in the functional entity mode. As shown in the user interface 400, the user can select a subset of in-vehicle components 106 to interact with by swiping across them. An example swipe gesture 402 of a user 404 selecting both light in-vehicle components 106 in the second row (e.g., indications 206-B and 206-C in seating zones 108-C and 108-D) and is shown in the user interface 400. Once the in-vehicle component(s) 106 have been selected, additional information can be rendered to the display 202, depending on the functional capabilities of the selected in-vehicle component(s) 106.

Figure 5:
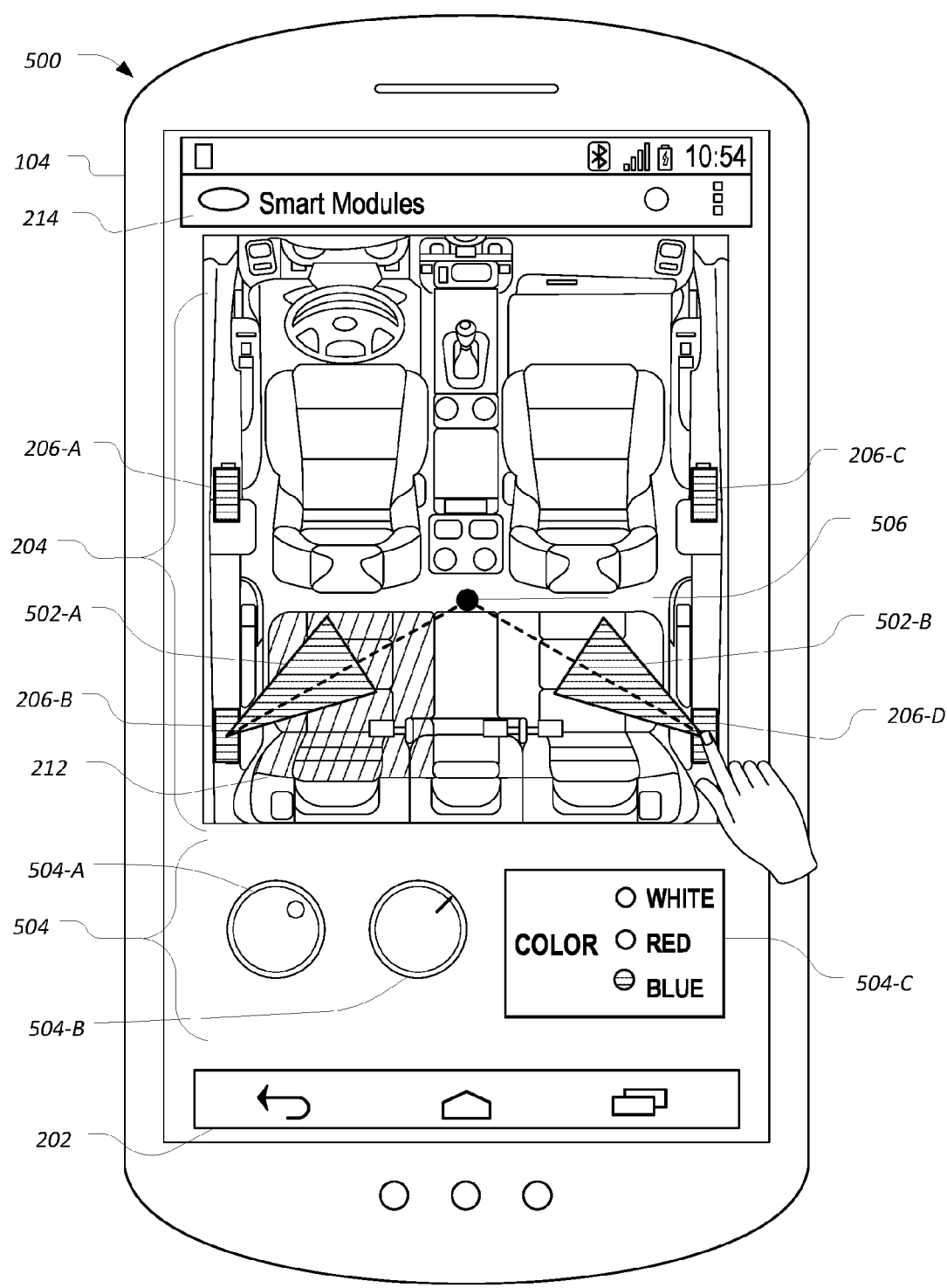
FIG. 5 illustrates an example user interface of the vehicle component interface application illustrating a collection of in-vehicle components being controlled in the functional entity mode.

FIG. 5 illustrates an example user interface 500 of the vehicle component interface application 118 illustrating a collection of in-vehicle components 106 being controlled in the functional entity mode. Continuing with the example selection of two light in-vehicle components 106 shown in the user interface 400, the user interface 500 illustrates a graphical representation overlaid on the interior map 204 of a first output 502-A emanating from the selected indication 306-A and of a second output 502-B emanating from the selected indication 306-B (collectively 502). The user interface 500 may also include component controls 504 for collectively controlling the functionality of the collection of in-vehicle components 106. The user interface may additionally or alternately include a handle control 506 for the collective aiming of the collection of in-vehicle components 106 to a particular location.

The outputs 502 may be overlaid in the interior map 204 in accordance with the current settings of the in-vehicle components 106 being controlled. In an example, the outputs 502 may be light, and the color of the outputs 502 may be displayed in a color corresponding to the current color of light set for the in-vehicle component 106, the length of the outputs 502 may be displayed in a length corresponding to the intensity set for the in-vehicle component 106, and the direction of the outputs 502 may be displayed in an angle and shape corresponding to the aiming set for the in-vehicle component 106.

The component controls 504 may include one or more controls for the adjustment of the functionality of the collection of in-vehicle components 106 being controlled. Continuing with the light in-vehicle component 106 example, the component controls 504 may include a light direction control 504-A for adjusting the aiming of the light in-vehicle components 106, an intensity control 504-B for adjusting the brightness of the light in-vehicle components 106, and a color control 504-C for adjusting the color of lighting provided by the light in-vehicle components 106. For instance, the user may select one or more of the indications 206 to adjust the settings of the one or more of the in-vehicle components 106, or may adjust the settings of the collection of in-vehicle components 106 collectively.

In an example, the component controls 504 may be displayed in place of the legend control 208, although other layouts possibilities may be used as well. For example, the component controls 504 may be displayed above or below or next to the legend controls 208, as some other possibilities (not shown).

The vehicle component interface application 118 may determine the specific component controls 504 to display based on information provided by the in-vehicle components 106 to be controlled. In an example, vehicle component interface application 118 may enumerate the characteristic UUIDs of the characteristics of the service UUID of the in-vehicle components 106 being controlled, and may decode information from the characteristic UUIDs, such as a listing of names and/or identifiers of the available features of the in-vehicle component 106 and/or information indicative of the current state of the in-vehicle component 106. In another example, the information indicative of the options for the component controls 504 may be pre-stored to the personal device 104. In yet another example, the information indicative of the options for the component controls 504 may be downloaded from a server included within the vehicle 102, or from one of the in-vehicle components 106 configured to serve control information to the personal device 104. In yet another example, the one of the in-vehicle components 106 configured to serve control information to the personal device 104 may provide the personal device 104 with an identifier of the vehicle 102 (e.g., VIN), or an identifier of the in-vehicle component 106 or type corresponding to the in-vehicle component 106. This identifier may then be used in a query to a server external to the vehicle 102, which may return the information indicative of the options for the component controls 504 to the personal device 104.

The light intensity, direction, and color may accordingly be directly controlled from the user interface 300 using the component controls 504. Moreover, the collective aiming and intensity of the in-vehicle components 106 may be collectively controlled using the handle control 506 as discussed in more detail in combination with FIG. 6.

Figure 6:
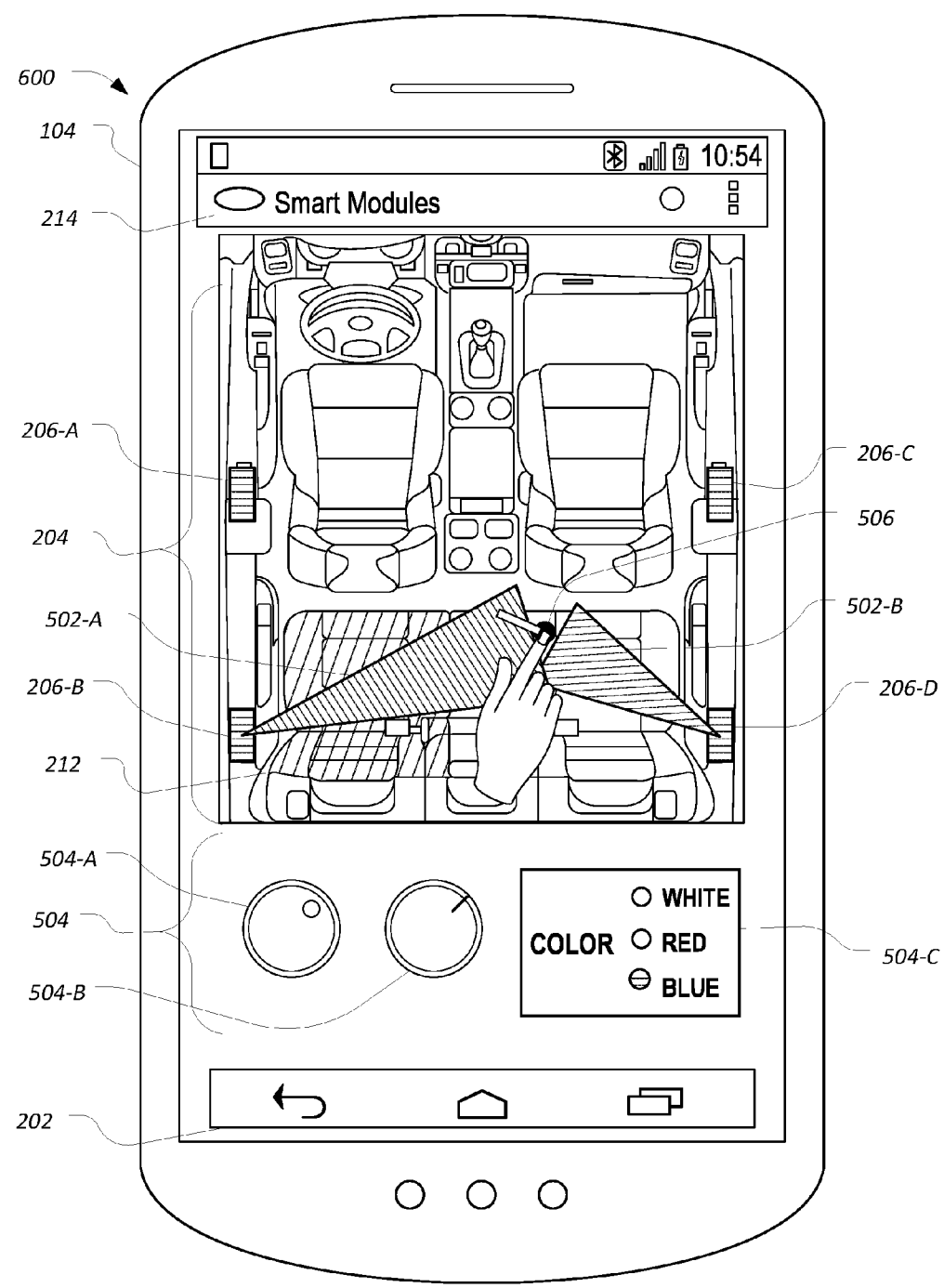
FIG. 6 illustrates an example user interface of the vehicle component interface application illustrating a collection of in-vehicle components being controlled in the functional entity mode using the handle control.

FIG. 6 illustrates an example user interface 600 of the vehicle component interface application 118 illustrating a collection of in-vehicle components 106 being controlled in the functional entity mode using the handle control 506. In an example, the user may drag the handle control 506 from a first location (e.g., as shown in the user interface 500) to a new location (e.g., as shown in the user interface 600).

Responsive to the location provided to the display 202, the vehicle component interface application 118 may adjust the direction, intensity, spread, and/or other properties of the in-vehicle components 106 to effect the change in aiming of the collection of in-vehicle components 106. For example, to move the aiming of the in-vehicle components 106-B and 106-D from the center of the vehicle 102 to a location in the passenger read seating zone 108-D, the vehicle component interface application 118 may increase the intensity of the in-vehicle components 106-B that is farther from that location, decrease the intensity of the in-vehicle components 106-D that is closer to that location, and adjust the aiming of the in-vehicle components 106-B and 106-D direct the light to the indication location. The outputs 502 overlaid in the interior map 204 may also be updated in accordance with the updated settings of the in-vehicle components 106 being controlled. Thus, when integrating a mesh of in-vehicle components 106 into a connection in the functional entity mode, the vehicle component interface application 118 may provide the ability of each in-vehicle component 106 of the collection to be controlled as a collective group.

Figure 7:
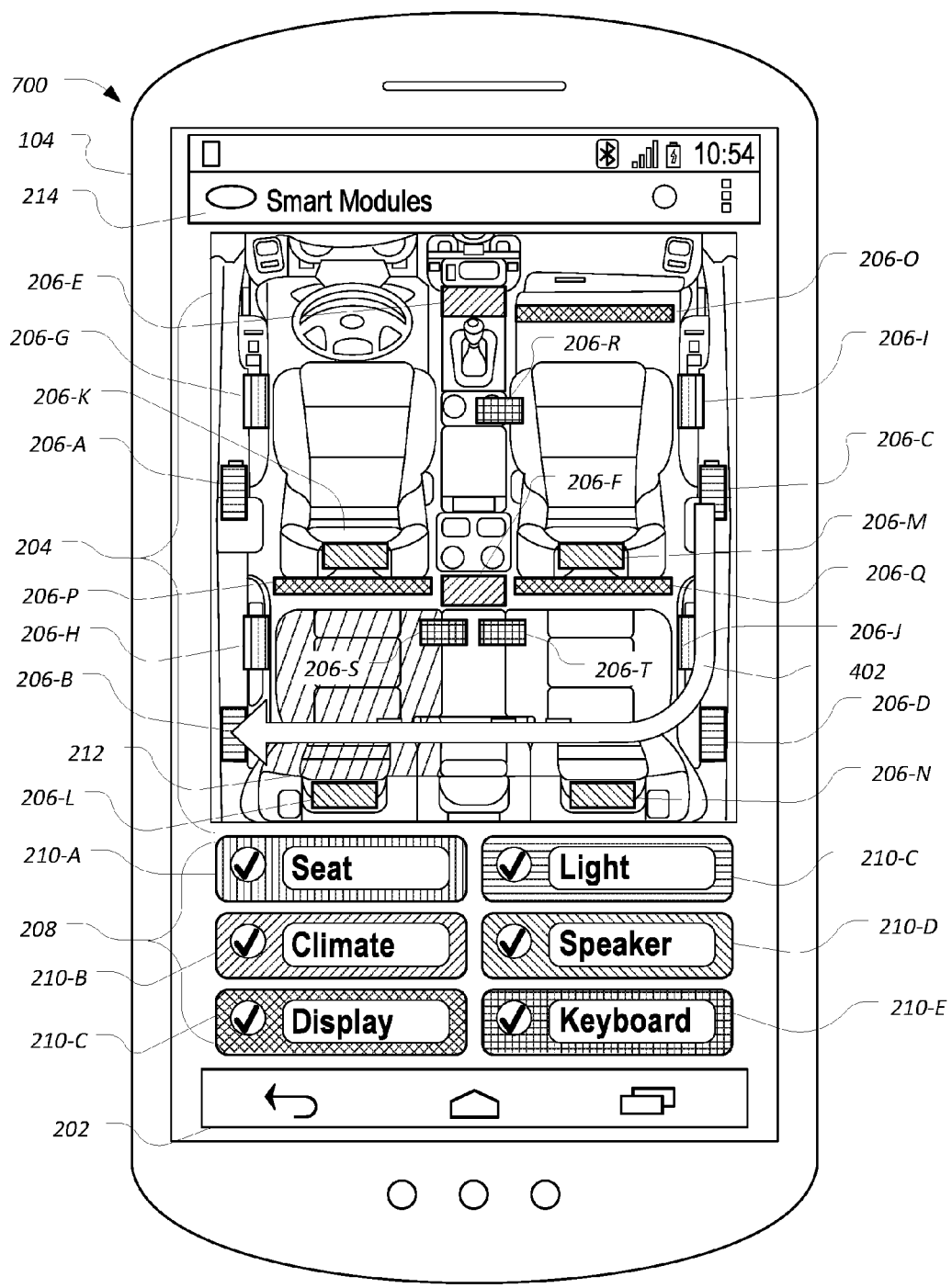
FIG. 7 illustrates an example user interface of the vehicle component interface application illustrating an alternate collection of in-vehicle components being selected using a swipe gesture.

FIG. 7 illustrates an example user interface 700 of the vehicle component interface application 118 illustrating an alternate collection of in-vehicle components 106 being selected using a swipe gesture. As shown in the user interface 700, the user can select a subset of in-vehicle components 106 to interact with by swiping in multiple dimensions across them. The example swipe gesture 402 selects both light in-vehicle components 106 in the second row (e.g., indications 206-B and 206-C in seating zones 108-C and 108-D) and also a light in-vehicle component 106 in the first row of the vehicle 102, as compared to the swipe 402 illustrated in the user interface 400.

While not shown, in some examples multiple swipe 402 gestures may be used to compose a group of in-vehicle components 106 for control. For instance, a first gesture 402 may be used to select a set of in-vehicle components 106, and a second gesture 402 may be used to select additional in-vehicle components 106 to be added to the group.

As another example, the vehicle component interface application 118 may support both additive and subtractive gestures. For example, a swipe 402 gesture of an additive type may be used to add components to a group, and a swipe 402 gesture of a subtractive type may be used to remove one or more components from the group. As one non-limiting possibility, an additive swipe may use one finger, and a subtractive swipe may use two fingers.

Figure 8:
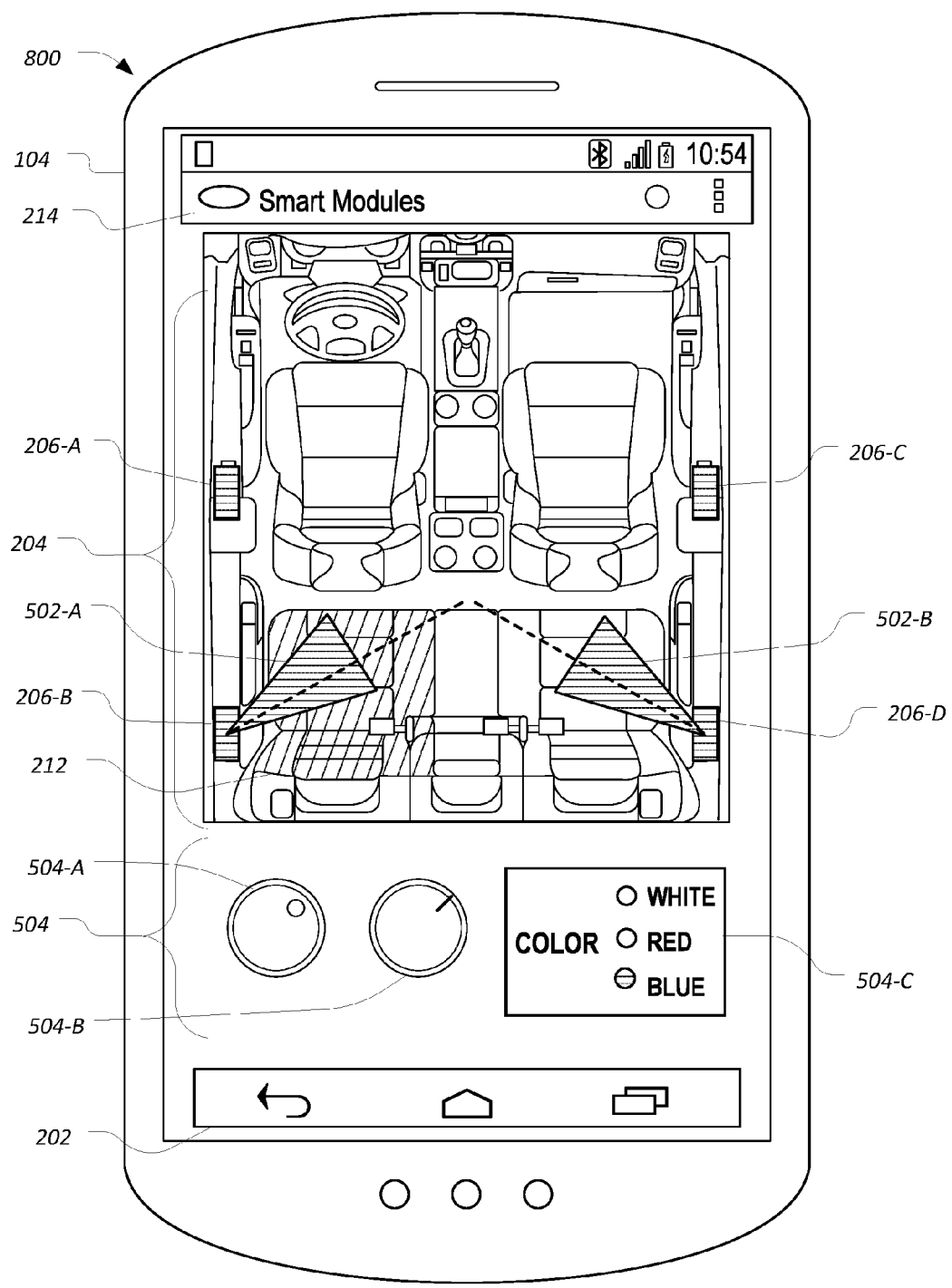
FIG. 8 illustrates an example user interface of the vehicle component interface application illustrating a collection of in-vehicle components displayed in the functional entity mode without the handle control.

FIG. 8 illustrates an example user interface 800 of the vehicle component interface application 118 illustrating a collection of in-vehicle components 106 displayed in the functional entity mode without the handle control 506. For example, rather than use of the handle control 506, a painting interaction may be employed to collectively control the in-vehicle components 106. Similar to as illustrated above with respect to the user interface 400, a user may create a group of two light in-vehicle components 106.

Figure 9:
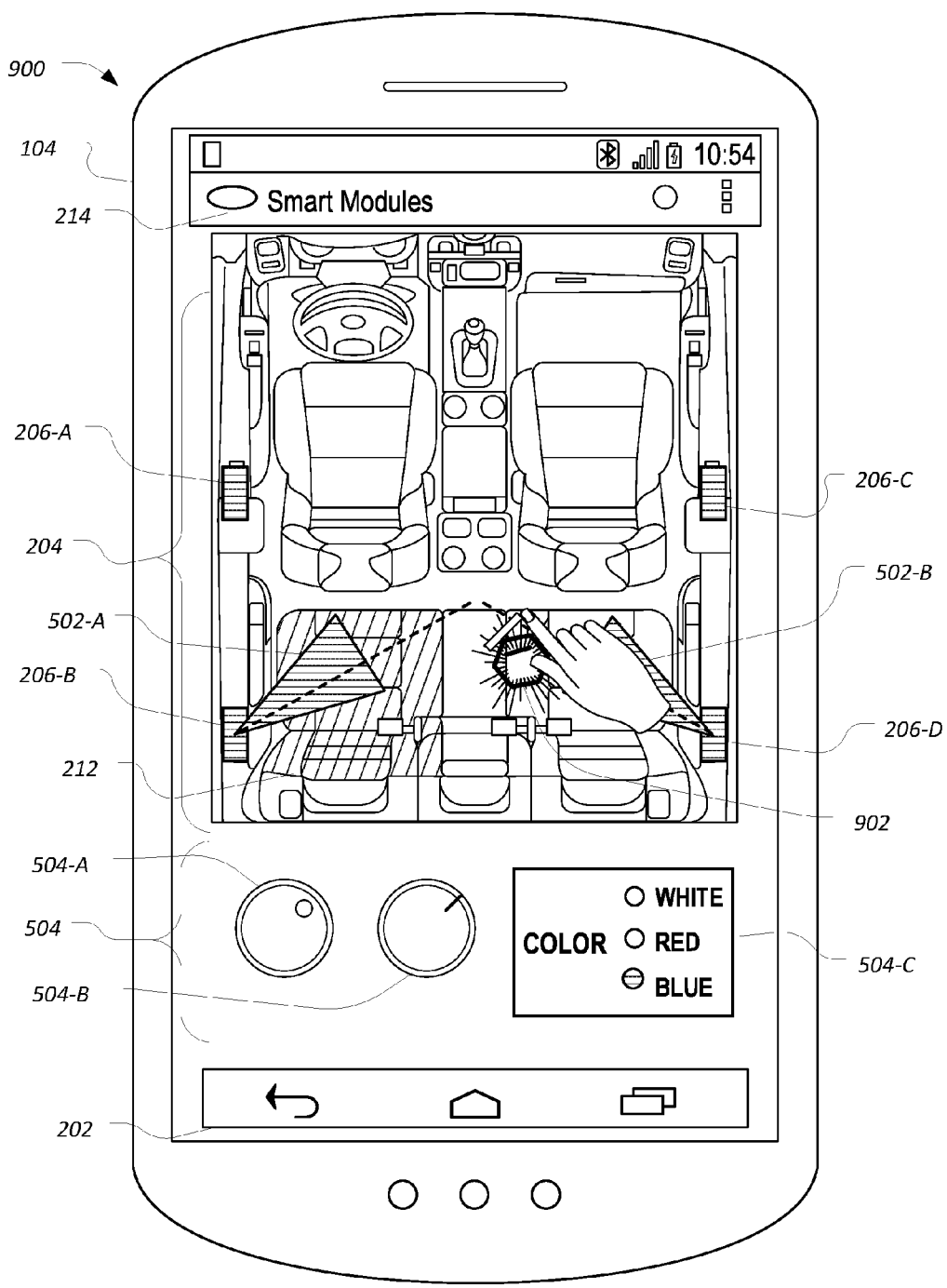
FIG. 9 illustrates an example user interface of the vehicle component interface application illustrating a collection of in-vehicle components being controlled in the functional entity mode using the painting interaction paradigm.

FIG. 9 illustrates an example user interface 900 of the vehicle component interface application 118 illustrating a collection of in-vehicle components 106 being controlled in the functional entity mode using the painting interaction. As shown, the user interface 900 the user paints a desired maximum light intensity region 902 onto the display 202 of the user interface 900. The region 902 accordingly indicates to the vehicle component interface application 118 that the settings of the collection of in-vehicle components 106 are to be adjusted to provide maximum illumination to the identified region 902. Responsive to the region 902 provided to the display 202, the vehicle component interface application 118 may adjust the direction, intensity, spread, and/or other properties of the in-vehicle components 106 to effect the change in aiming of the collection of in-vehicle components 106.

Figure 10:
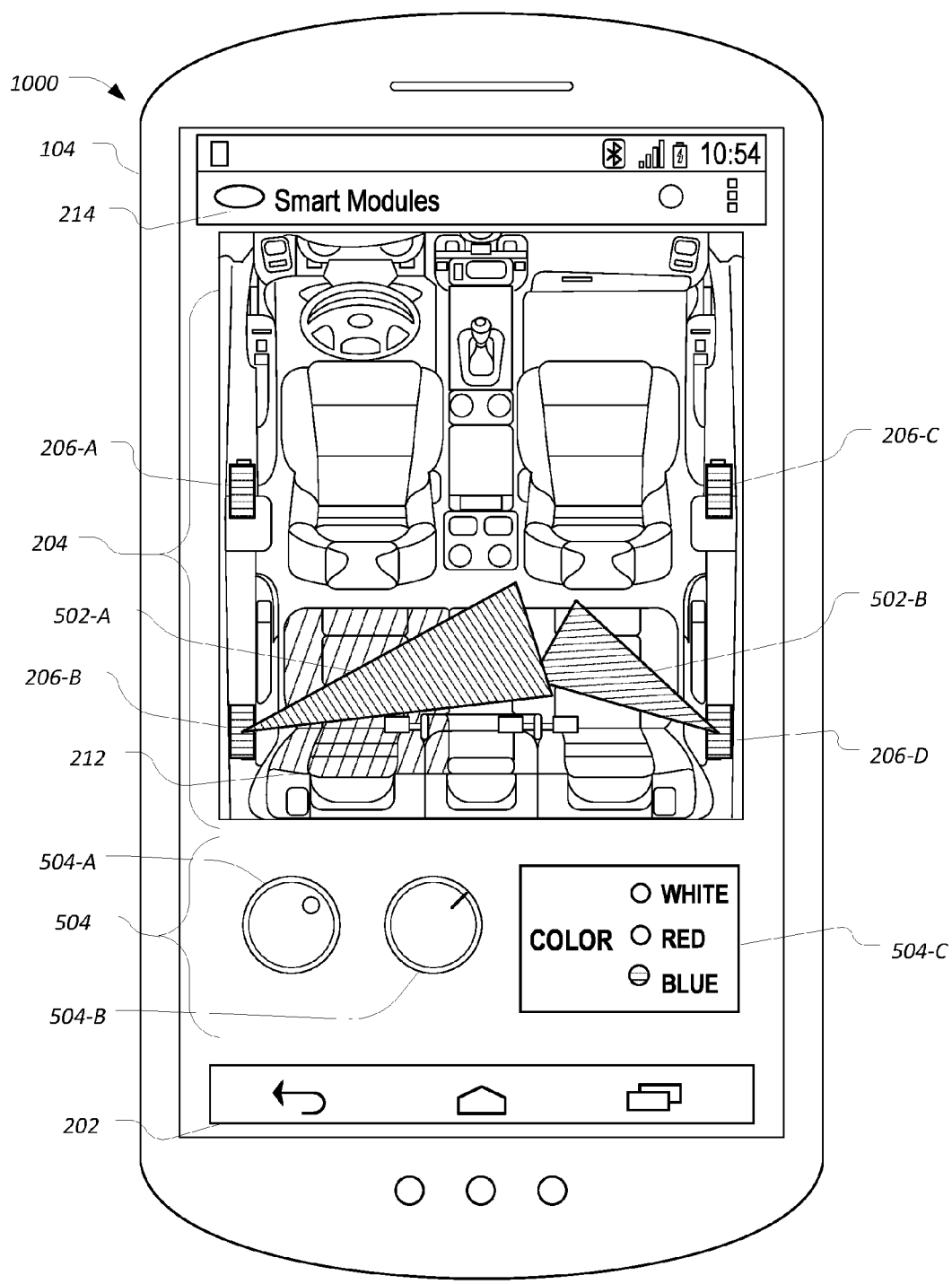
FIG. 10 illustrates an example user interface of the vehicle component interface application illustrating a collection of in-vehicle components having been adjusted in the functional entity mode using the painting interaction paradigm.

FIG. 10 illustrates an example user interface 1000 of the vehicle component interface application 118 illustrating a collection of in-vehicle components 106 having been adjusted in the functional entity mode using the painting interaction paradigm. As shown in the user interface 1000, the vehicle component interface application 118 increased the intensity of the in-vehicle component 106-B that is farther from that location, and adjusted the aiming of the in-vehicle components 106-B and 106-D direct the light to the painted location.

Figure 11:
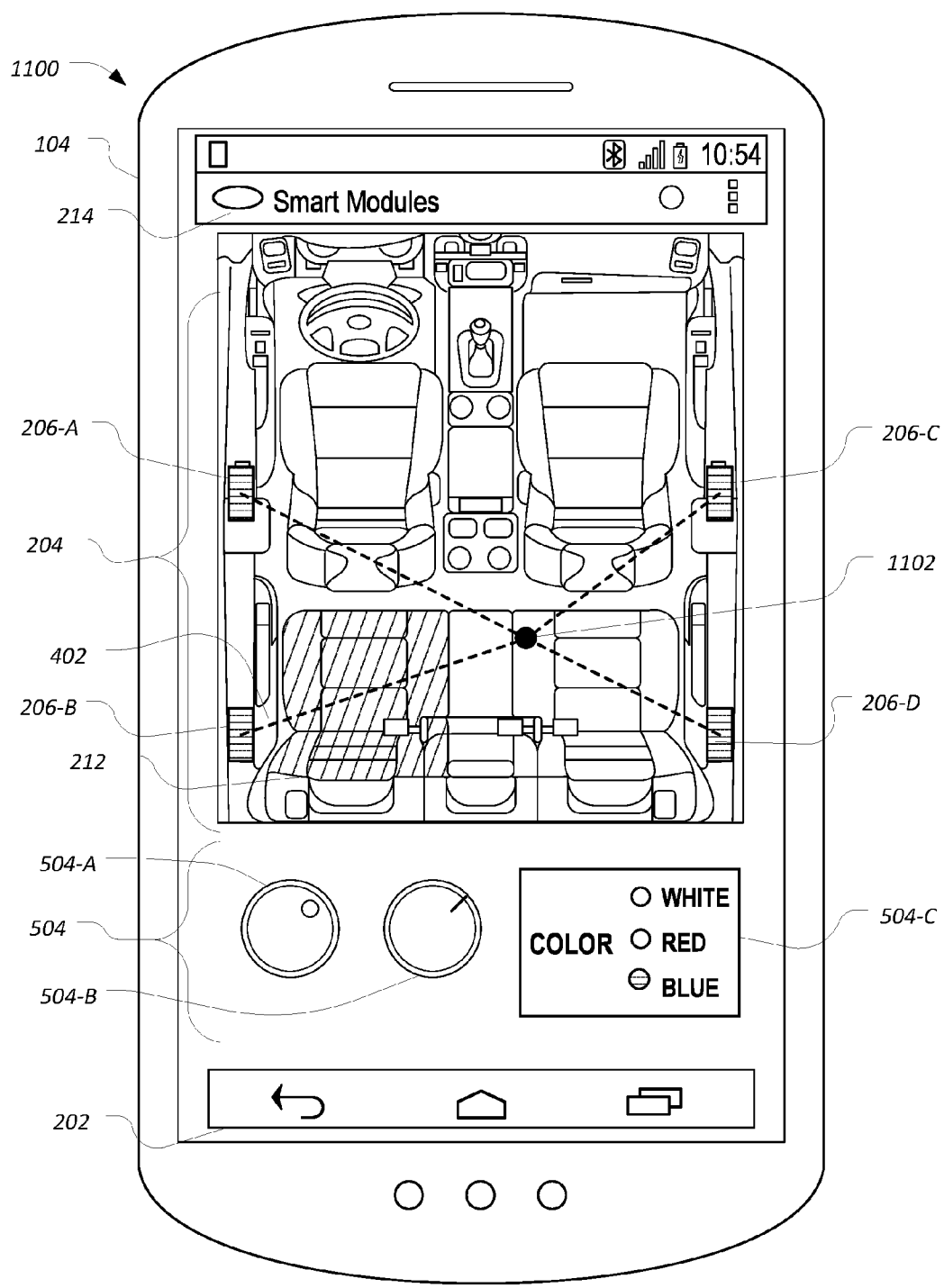
FIG. 11 illustrates an example user interface of the vehicle component interface application illustrating a collection of in-vehicle components being controlled in the functional entity mode using an exclusion area.

FIG. 11 illustrates an example user interface 1100 of the vehicle component interface application 118 illustrating a collection of in-vehicle components 106 being controlled in the functional entity mode using an exclusion area. In the exclusion area paradigm, the vehicle component interface application 118 may offer an option of a negative brush or location, for which the user could input an exclusion area or location from which the light from the in-vehicle components 106 should be excluded. As shown, the user interface 100 includes an exclusion handle control 1102 for the collective aiming of the collection of in-vehicle components 106 away from a particular location. This may be useful, for example, to direct light away from a display of a device, or in the event of a passenger desiring a darker seating zone 108 in order to rest.

Similar to as discussed above with respect to the handle 506, responsive to the input provided using the exclusion handle control 1102, the vehicle component interface application 118 may adjust the direction, intensity, spread, and/or other properties of the in-vehicle components 106 to effect the change in aiming of the collection of in-vehicle components 106. For example, to move the aiming of the in-vehicle components 106-A, 106-B, 106-C, and 106-D away from the indicated location, the vehicle component interface application 118 may adjust the aiming, spread, and/or intensity of the in-vehicle components 106-A, 106-B, 106-C, and 106-D direct the light away from the indication location.

Figure 12:
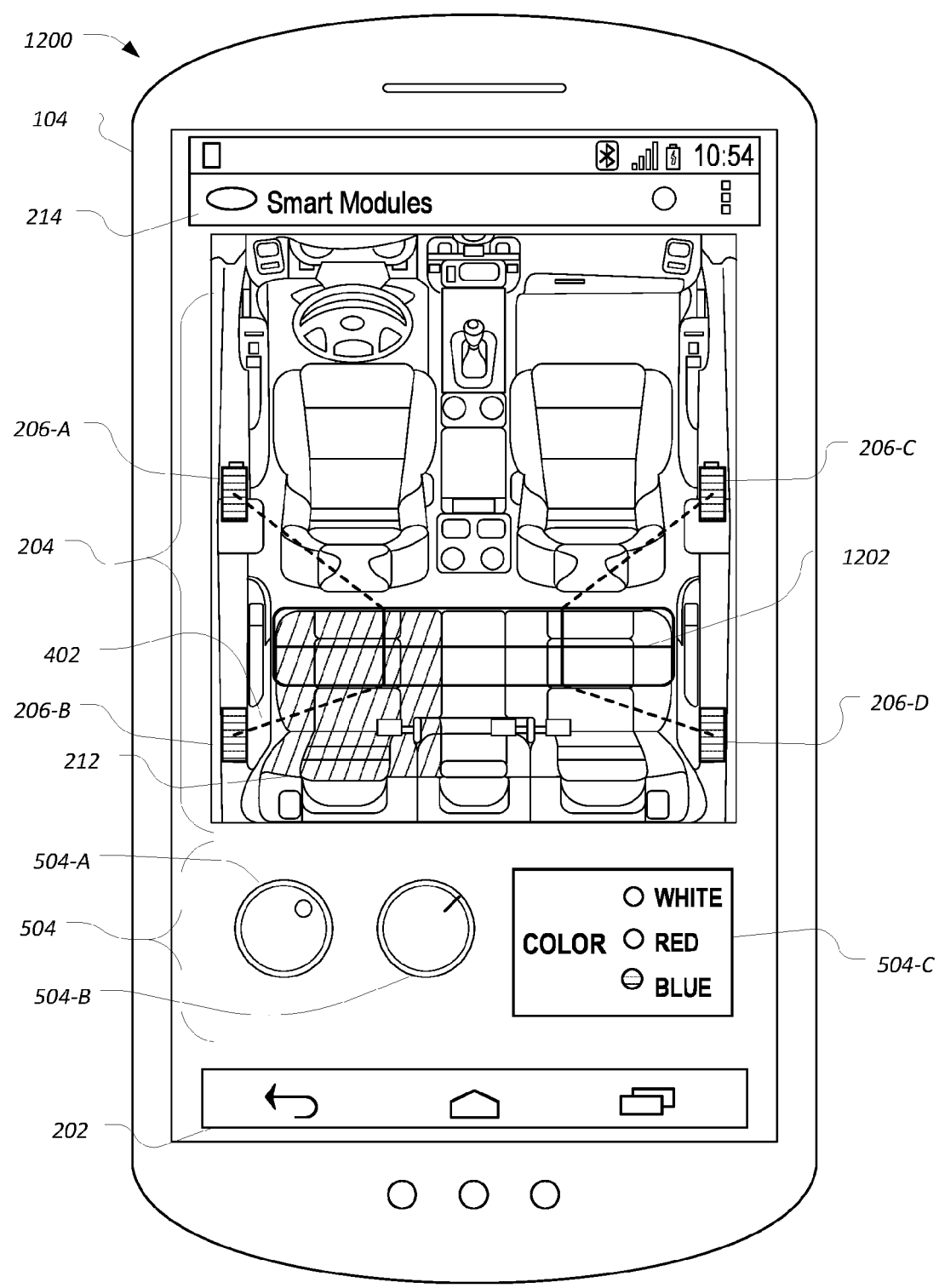
FIG. 12 illustrates an example user interface of the vehicle component interface application including an adjustable region of the vehicle according to which the output of the in-vehicle components may be controlled.

FIG. 12 illustrates an example user interface 1200 of the vehicle component interface application 118 including an adjustable region 1202 of the vehicle 102 according to which the output of the in-vehicle components 106-A, 106-B, 106-C, and 106-D may be controlled. The adjustable region 1202 may allow the user to specify a portion of the cabin of the vehicle 102 from which light or other output may be directed or excluded. The user interface 1200 may be displayed in an example, responsive to the user selecting in-vehicle components 106 for collective control. In another example, the user interface 1200 may be displayed responsive to user selection of an option to adjust the in-vehicle components 106 according to an adjustable region 1202.

A user may use gesture input to adjust various attributes of the adjustable region 1202. These attributes may include, for example, location, width, height, and orientation. For instance, adjustments to the height or width of the adjustable region 1202 may be performed using pinch gestures in which two fingers are placed on the adjustable region 1202 are and spread apart to increase the size of the region 1202 or are moved towards one another to decrease the size of the region 1202. Or, adjustments to an edge of the adjustable region 1202 may be performed by dragging gestures performed by placing a finger onto a side of the adjustable region 1202 to be moved, moving the side to the new location, and releasing the finger. Or, the orientation of the adjustable region 1202 may be adjusted by a user placing two fingers into the region and rotating the fingers to perform a corresponding rotation to the adjustable region 1202. As some other possibilities, a user may draw the adjustable region 1202 by using a finger to draw a boundary completely enclosing an area to be adjusted, or by painting a filled area to be adjusted.

Once drawn, the adjustable region 1202 may be activated by an area activation gesture. In an example, a user may tap within the adjustable region 1202 to activate the adjustable region 1202 for use in directing of output from the selected in-vehicle components 106 into the adjustable region 1202. As another example, a single tap within the adjustable region 1202 may activate the adjustable region 1202 for directing output from the selected in-vehicle components 106 into the adjustable region 1202, while a double tap within the adjustable region 1202 may activate the adjustable region for excluding output from the selected in-vehicle components 106 out of the adjustable region 1202. As yet a further example, selection of the adjustable region 1202 for directing output into the region 1202 may be indicated by a tap with a single finger, while selection of the adjustable region 1202 for excluding output from the region 1202 may be indicated by a tap from two fingers.

It should be noted that while many of the examples described herein relate to light in-vehicle controls 106, it should be noted that the disclosure applies to other types of vehicle interior functions characterized by directionality, intensity and spread, such as climate control air output 502 from air vents or sound output 502 from speakers. Depending on the specific type of in-vehicle components 106 that are being controlled, the relationship between intensity and distance for the output 502 may change. Such output 502 relationship may be pre-coded into the vehicle component interface application 118 or may be provided by the in-vehicle components 106 similar to as discussed above with respect to the providing of the information for display and configuration of the component controls 504.

Moreover, while in many examples the vehicle component interface application 118 is described as adjusting the specific intensity, spread, and/or location of the in-vehicle components 106, in other examples, the vehicle component interface application 118 may instead provide information to the in-vehicle components 106 specifying the desired coordinate location to provide or not provide output 502, where the in-vehicle components 106 determine themselves how to self-adjust intensity, aim, spread, etc. in accordance with the provided location coordinates. As one non-limiting possibility, these coordinates may be provided to the in-vehicle components 106 in an encoding similar to that used for the encoding of location information in the UUID information of the in-vehicle component 106.

Figure 13:
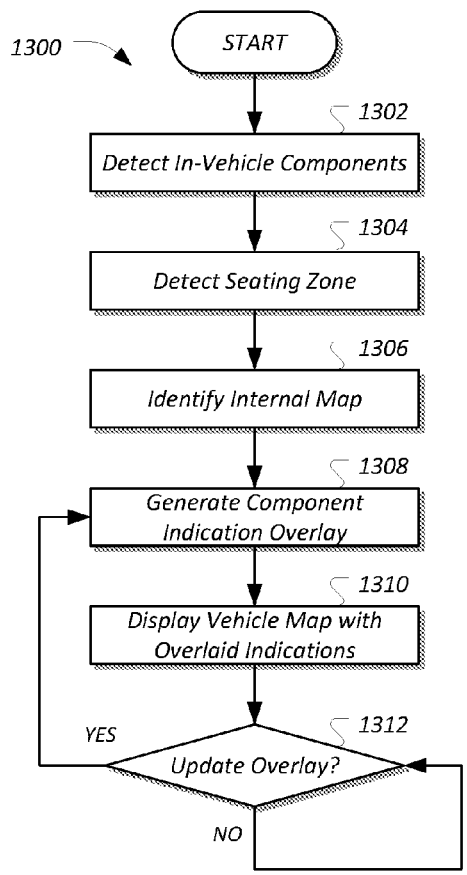
FIG. 13 illustrates an example process for displaying indications of in-vehicle components for collective control by the personal device.

FIG. 13 illustrates an example process 1300 for displaying indications of in-vehicle components 106 for collective control by the personal device 104. The process 1300 may be performed, in an example, by the vehicle component interface application 118 executed by the personal device 104 of the user.

At operation 1302, the personal device 104 detects the in-vehicle components 106 of the zone 108 of the vehicle 102. In an example, the vehicle component interface application 118 may identify what in-vehicle components 106 are available within the vehicle 102 according to the advertisements of the in-vehicle components 106 identified using the wireless transceiver 112 of the personal device 104.

At 1304, the process 1300 determines the seating location of the user within the vehicle 102. In an example, signal strength 116 information between the personal device 104 and the in-vehicle components 106 may be utilized to detect the location of the personal device 104. In many examples, the determination of the zone 108 may be performed by the vehicle component interface application 118. In another example, the determination may be performed by one or more of the in-vehicle components 106 of the vehicle 102, and may be indicated to the vehicle component interface application 118 of the personal device 104.

At operation 1306, the personal device 104 identifies the interior map 204 of the vehicle 102. In an example, the interior map 204 may be a generic vehicle 102 interior image or previously downloaded image retrieved from the storage of the personal device 104. In another example, the interior map 104 may be downloaded from a server included within the vehicle 102, or from one of the in-vehicle components 106 configured to serve component information to the personal device 104. In yet another example, the one of the in-vehicle components 106 configured to serve component information to the personal device 104 may provide the personal device 104 with an identifier of the vehicle 102 (e.g., VIN), or an identifier of the interior map 204 image corresponding to the vehicle 102. This identifier may then be used in a query to a server external to the vehicle 102, which may return the interior map 204 to the personal device 104.

In 1308, the personal device 104 generates the component indications 206 for overlay over the interior map 204. In an example, the component types, locations and/or dimensions of the component indications 206 may be identified according to location information decoded from the service UUIDs of the advertisement data of the corresponding in-vehicle components 106. In another example, one of the in-vehicle components 106 configured to serve vehicle 102 information to the personal device 104 may provide the personal device 104 with an identifier of the vehicle 102 (e.g., VIN) which may be used to query a server external to the vehicle 102 to retrieve the interior locations and dimensions of the in-vehicle components 106. The component indications 206 may further be generated in colors or patterns according to the types of the in-vehicle components 106. The vehicle component interface application 118 may also generate a legend control 208, such that each type indication 210 in the legend control 208 corresponds to one of the types of in-vehicle components 106, and is rendered in the same color or pattern as in which the component indications 206 of that type are rendered.

The personal device 104 sends the interior map 204 and component indications 206 for overlay to the display 202 at operation 1310. Examples of the displayed content include the user interfaces 200-1200 described in detail above.

At operation 1312, the personal device 104 determines whether the component indications 206 should be updated. In an example, the user may have selected to toggle the display or visibility of a type of component indications 206 by selecting one of the type indications 210 from the legend control 208. In another example, the personal device 104 may re-detect the in-vehicle components 106 of the vehicle 102, and may determine that one or more in-vehicle components 106 has been added or removed. If the component indications 206 should be updated, control passes to operation 1308. Otherwise, control remains at operation 1312.

Figure 14:
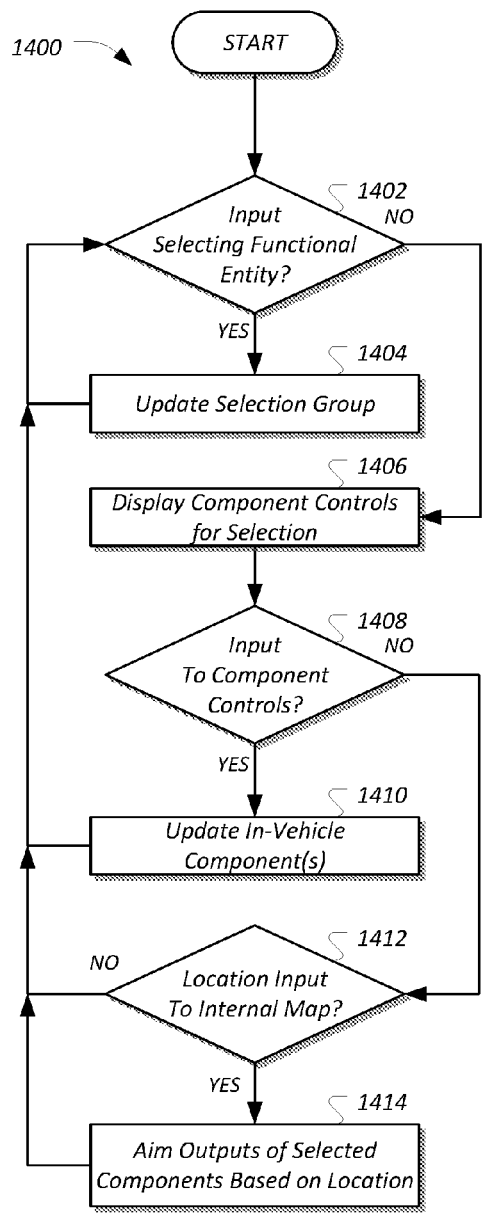
FIG. 14 illustrates an example process for collectively controlling a group of in-vehicle components.

FIG. 14 illustrates an example process 1400 for collectively controlling a group of in-vehicle components 106. The process 1400 may be performed, for example, by the personal device 104 displaying a user interface according to the process 1300.

In operation 1402, the personal device 104 determines whether gesture input selecting component indications 206 is received. In an example, the vehicle component interface application 118 may receive one or more gestures 402 from a user selecting in-vehicle components 106 from the display 202. The gestures 402 may include, for example, additive gestures 402 to add components to a group, and subtractive gestures 402 to remove one or more components from the group. Example gestures 402 are illustrated in the user interfaces 400 and 700. If one or more gestures 402 are received, the vehicle component interface application 118 determines the in-vehicle components 106 included within the selection at operation 1404. After operation 1404, control returns to operation 1402. If no new gestures 402 are received, control passes to operation 1406.

At 1406, the personal device 104 displays component controls 504 for the selected component indications 206. In an example, the vehicle component interface application 118 may display the component controls 504 in place of the legend control 208, although other layouts possibilities may be used as well. The vehicle component interface application 118 may further determine the specific component controls 504 to display based on information provided by the in-vehicle components 106 to be controlled, e.g., according to an enumeration of the characteristic UUIDs of the characteristics of the service UUID of the in-vehicle components 106 being controlled, by downloaded the information from a server included within or external to the vehicle 102, or by downloading the information from one of the in-vehicle components 106 configured to serve control information to the personal device 104. State information for the component controls 504 may also be retrieved by the vehicle component interface application 118 from the in-vehicle components 106 for presentation in the user interface.

The personal device 104 determines whether input to the component controls 504 is received at operation 1408. If input is received to one or more of the component controls 504, the vehicle component interface application 118 passes control to operation 1410. Otherwise, control passes to operation 1412.

At operation 1410, the one or more of the component controls 504 being controlled is updated with the user input. In an example, if the color of light to be provided by the in-vehicle components 106 is updated, the vehicle component interface application 118 applies the color selection to each of the in-vehicle components 106 of the selected group. After operation 1410, control passes to operation 1402.

At 1412, the personal device 104 determines whether location input is received to the interior map 204. In an example, the vehicle component interface application 118 may receive input from the handle control 506 from a user performing collective aiming of the collection of in-vehicle components 106 to a particular location. In another example, the vehicle component interface application 118 may receive input from the user painting a desired maximum light intensity region 902, or a region 1202 in which light is not preferred. If a location is received, control passes to operation 1414. Otherwise, control passes to operation 1402.

At operation 1414, the personal device 104 aims outputs of the selected in-vehicle components 105 based on the received location. In an example, responsive to the location provided to the display 202, the vehicle component interface application 118 may adjust the direction, intensity, spread, and/or other properties of the in-vehicle components 106 to effect the change in aiming of the collection of in-vehicle components 106. The adjustments may be made, for example, based on intensity and distance relationship information be pre-coded into the vehicle component interface application 118 or provided by the in-vehicle components 106 to the personal device 104. After operation 1414, control passes to operation 1402.

Computing devices described herein, such as the personal devices 104 and in-vehicle components 106, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a personal device including
      a display; and
      a processor, programmed to
         send, to the display, a vehicle interior map overlaid with indications of in-vehicle components,
         create a group of the in-vehicle components responsive to a gesture to the display selecting a subset of the indications,
         receive input from the display of a location on the map, and
         aim outputs of the in-vehicle components of the group based on the location.

2. The system of claim 1, wherein the processor is further programmed to:
   generate a first setting adjustment to a first in-vehicle component of the group to aim output of the first in-vehicle component; and
   generate a second setting adjustment to a second in-vehicle component of the group to aim output of the second in-vehicle component, the second setting adjustment being different from the first setting adjustment.

3. The system of claim 1, wherein the location on the map is a location to which outputs of the in-vehicle components of the group are to be aimed, and the processor is further programmed to adjust spread, intensity and direction of the outputs of the in-vehicle components of the group toward the location.

4. The system of claim 1, wherein the location on the map is a location to which outputs of the in-vehicle components of the group are to avoid, and the processor is further programmed to adjust spread, intensity and direction of the outputs of the in-vehicle components of the group away from the location.

5. The system of claim 1, wherein the processor is further programmed to send to the display a legend including type indications of the in-vehicle components, each type indication corresponding to one of a plurality of component types and being rendered in a different color or pattern, each component being of one of the plurality of component types, and each component indication being displayed in the color or pattern of the corresponding type indication.

6. The system of claim 5, wherein the processor is further programmed to:
   receive input from the display to one of the type indications; and
   responsive to the input, toggle visibility of the in-vehicle components of the type corresponding to the one of the type indications.

7. The system of claim 1, wherein the processor is further programmed to display output indications overlaid on the vehicle interior map emanating from the in-vehicle components and indicative of intensity and direction of the output of the in-vehicle components.

8. The system of claim 7, wherein the output indications indicate one of light output, climate control air output, or sound output.

9. The system of claim 1, wherein the processor is further programmed to specify the location as an adjustable region according to one or more of: (i) a size of the adjustable region defined according to input of a pinch gesture to the display; (ii) a placement of the adjustable region defined according to input of a drag gesture to the display; and (iii) an orientation of the adjustable region defined according to input of a rotation gesture to the display.

10. The system of claim 9, wherein the processor is further programmed to:
   activate the adjustable region as a location to which outputs of the in-vehicle components of the group are to be aimed responsive to receipt of gesture input of a first type to the display; and
   activate the adjustable region as a location to which outputs of the in-vehicle components of the group are to avoid responsive to receipt of gesture input of a second type different from the first type.

* * * * *